(12) United States Patent
Mehra et al.

(10) Patent No.: US 11,971,267 B2
(45) Date of Patent: Apr. 30, 2024

(54) USER JOURNEY CARBON FOOTPRINT REDUCTION

(71) Applicant: ACCENTURE GLOBAL SOLUTIONS LIMITED, Dublin (IE)

(72) Inventors: Rohit Mehra, Rohini (IN); Vibhu Saujanya Sharma, Bangalore (IN); Dimple Walia, Gurgaon (IN); Prerna Khurana, Delhi (IN); Prasad Venkata Sai Banda, Dwarka (IN); Rahul Grover, Saharanpur (IN); Sukanta Paul, Bangalore (IN); Sunil Maggu, Gurugram (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 273 days.

(21) Appl. No.: 17/493,503

(22) Filed: Oct. 4, 2021

(65) Prior Publication Data
US 2022/0107193 A1 Apr. 7, 2022

(30) Foreign Application Priority Data
Oct. 5, 2020 (IN) .............................. 202011043230

(51) Int. Cl.
*G01C 21/34* (2006.01)
*G01C 21/36* (2006.01)
(Continued)

(52) U.S. Cl.
CPC ..... *G01C 21/3469* (2013.01); *G01C 21/3484* (2013.01); *G01C 21/3676* (2013.01); *G06N 5/02* (2013.01); *G06T 19/006* (2013.01)

(58) Field of Classification Search
CPC ............ G01C 21/3469; G01C 21/3484; G01C 21/3676; G01C 21/3697; G06N 5/02; G06N 20/00; G06T 19/006
See application file for complete search history.

(56) References Cited

U.S. PATENT DOCUMENTS 7,949,180 B2 5/2011 Maeda et al.
8,732,058 B2 5/2014 Margolis et al.
(Continued)

FOREIGN PATENT DOCUMENTS

| EP | 3090037 A1 | 11/2016 |
|----|------------|---------|
| GB | 2479469 A | 10/2011 |
| WO | 2018039445 A1 | 3/2018 |

OTHER PUBLICATIONS

"The charcoal vision: A win-win-win scenario for simultaneously producing bioenergy, permanently sequestering carbon, while improving soil and water quality", Agronomy Journal, American Society of Agronomy, Inc, US, vol. 100, No. 1, pp. 178-181, ISSN: 0002-1962, DOI: 10.2134/AGRONJ2007.0161. (Jan. 1, 2008).

*Primary Examiner* — Kira Nguyen
(74) *Attorney, Agent, or Firm* — Mannava & Kang, P.C.

(57) ABSTRACT

In some examples, user journey carbon footprint reduction may include generating, for a vehicle associated with a user, a carbon emission quota for user journey carbon footprint reduction. A predicted journey carbon emissions may be generated for the vehicle for a specified journey. Based on collaborative filtering, at least one goal-based and conditions-based recommendation may be generated for the user of the vehicle for the specified journey for the user journey carbon footprint reduction. Based on a user behavior model, a user-interface display may be generated for the specified journey for the user journey carbon footprint reduction. Further, based on the user behavior model, and real-time monitoring of the user and the vehicle, a real-time update of the user-interface display may be generated for the specified journey for the user journey carbon footprint reduction.

20 Claims, 26 Drawing Sheets

(51) Int. Cl.
  *G06N 5/02* (2023.01)
  *G06T 19/00* (2011.01)

(56) References Cited

U.S. PATENT DOCUMENTS

| | | | |
|---|---|---|---|
| 9,565,053 B2 | 2/2017 | Kadota | |
| 2011/0238457 A1* | 9/2011 | Mason | G06Q 10/063112 |
| | | | 705/7.14 |
| 2012/0194290 A1* | 8/2012 | Wu | H01P 1/2039 |
| | | | 333/246 |
| 2012/0208254 A1 | 8/2012 | Smith et al. | |
| 2013/0192321 A1 | 8/2013 | Cheiky et al. | |
| 2022/0187089 A1* | 6/2022 | Leung | B60W 50/14 |
| 2022/0358845 A1* | 11/2022 | Holmes | G08G 5/0039 |

* cited by examiner

Example Scenarios

1200

| Case | Distance | Traffic | PUC | Tyre Pressure | Thermal status | Service Status | Fuel Efficiency | Region | Acting Coefficient | Calculated CF (CO2e) |
|---|---|---|---|---|---|---|---|---|---|---|
| #1 | 10 Mi | Low | - | - | - | - | 10 Mi/L | USA | - | X |
| #2 | 10 Mi | High | - | - | - | - | 10 Mi/L | USA | t = 1.2 | 1.2X |
| #3 | 10 Mi | High | - | Low | - | - | 10 Mi/L | USA | C = 1.03 | 1.23X |
| #4 | 10 Mi | High | - | Low | Cold | - | 10 Mi/L | USA | s = 1.3 | 1.53X |

1: Normal CF Calculation based upon Distance, Fuel Efficiency and Traffic.

2: Traffic status High. As per the model, increase in traffic leads to 1.2x times the standard carbon emissions.

3: Tyre Pressure Low. As per the model, decrease in tyre pressure leads to 1.03x times the standard carbon emissions.
  - *"if everybody kept their tires inflated, that would have a big deal, it would produce as much oil savings as we might be pumping in some of these offshore oils by drilling"*
  - — *Former President, Barak Obama, 2008 Elgin City Address*

4: Thermal status Cold Start. As per the model, a cold start leads to 1.3 times the standard of carbon emissions, as opposed to a hot start.

Note: Carbon footprint is dependent on multiple attributes (a few shown above) and each one of them impacts CF in a different way. Hence, they all need to be considered, to generate more practical predictions/estimations.

FIG. 12

Example Scenarios

Assumption: Assigned Carbon Quota = 10kg CO2e

| Carbon Quota Remaining (CO2e) | Alternate Configured Vehicles | Predicted Journey CF (CO2e) | Vehicle Advisory |
|---|---|---|---|
| 10 Kg | 4-Wheeler #1<br>4-Wheeler #2<br>2-Wheeler #1<br>Bicycle #1 | 4 Kg<br>3.5 Kg<br>1 Kg<br>0.3 Kg | 4-Wheeler #1<br>4-Wheeler #2<br>2-Wheeler #1<br>Bicycle #1 |
| 5 Kg | 4-Wheeler #1<br>4-Wheeler #2<br>2-Wheeler #1<br>Bicycle #1 | 4 Kg<br>3.5 Kg<br>1 Kg<br>0.2 Kg | 4-Wheeler #1<br>4-Wheeler #2<br>2-Wheeler #1<br>Bicycle #1 |
| 2 Kg | 4-Wheeler #1<br>4-Wheeler #2<br>2-Wheeler #1<br>Bicycle #1 | 4 Kg<br>3.5 Kg<br>1 Kg<br>0.3 Kg | 2-Wheeler #1<br>Bicycle #1 |
| 0.5 Kg | 4-Wheeler #1<br>4-Wheeler #2<br>2-Wheeler #1<br>Bicycle #1 | 4 Kg<br>3.5 Kg<br>1 Kg<br>0.2 Kg | Bicycle #1 |

Note: As the day progresses, recommendations keep changing based upon user's emissions pattern.

FIG. 15

Example Scenarios

| Case | Distance | Traffic | Speed Variation | Route Health | Humidity | Ambient Temperature | Engine Noise | Region | Calculated CF (CO2e) |
|---|---|---|---|---|---|---|---|---|---|
| #1 | 10 Mi | Low | - | - | - | - | - | USA | X |
| #2 | 10 Mi | Low | High | - | - | - | - | USA | 1.1X |
| #3 | 10 Mi | Low | High | Bad | - | - | - | USA | 1.15X |
| #4 | 10 Mi | Low | High | Bad | High | - | - | USA | 1.27X |

1: Normal CF Calculation based upon Distance, Fuel Efficiency and Traffic.

2: Speed variation High. As per the model, increase in speed variations leads to 1.1x times the standard carbon emissions.

3: Route Health Bad. As per the model, a bad route leads to ~1.05x times the standard carbon emissions.

4: Humidity High. As per the model, increase in humidity leads to 1.12 times the standard carbon emissions.

Note: While driving, Carbon Footprint is dependent on multiple attributes (a few shown above) and each one of them impacts CF in a different way. Hence, they all need to be considered to generate more practical predictions/estimations/real-time calculations.

FIG. 17

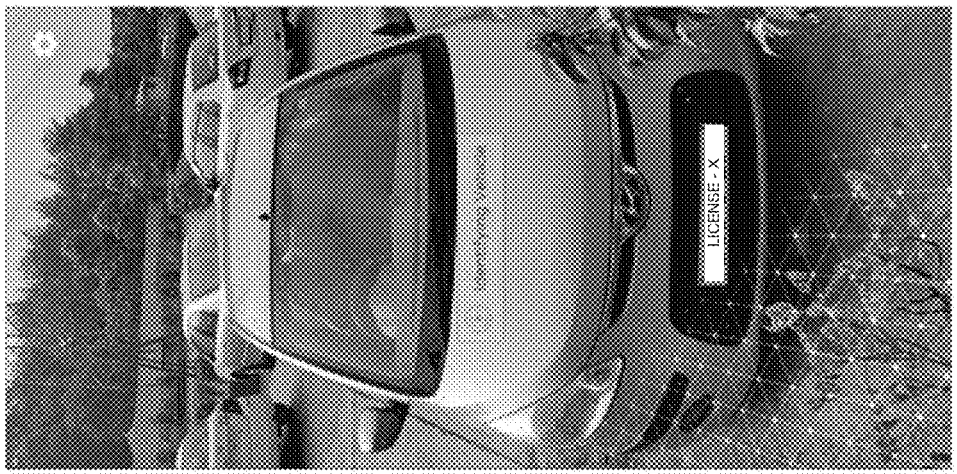
FIG. 20

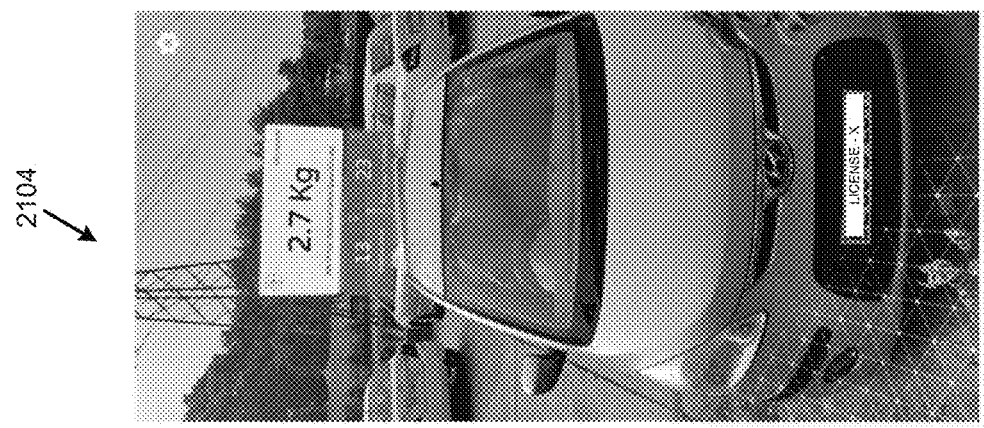
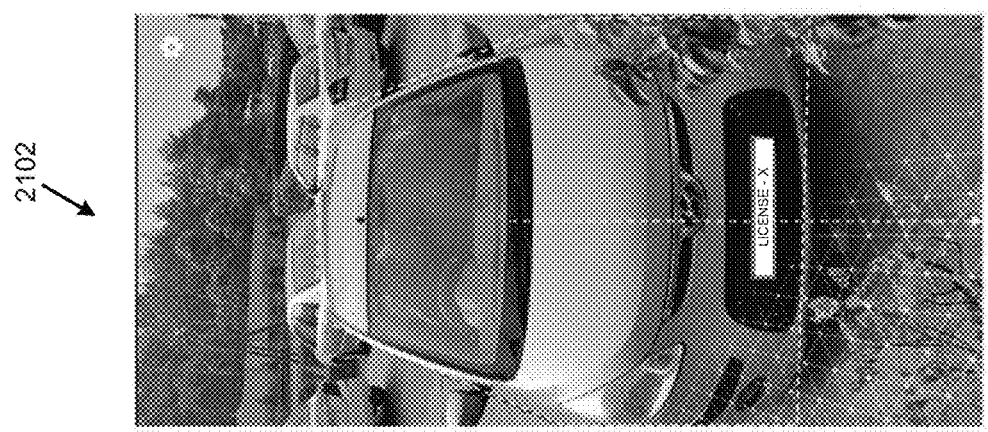
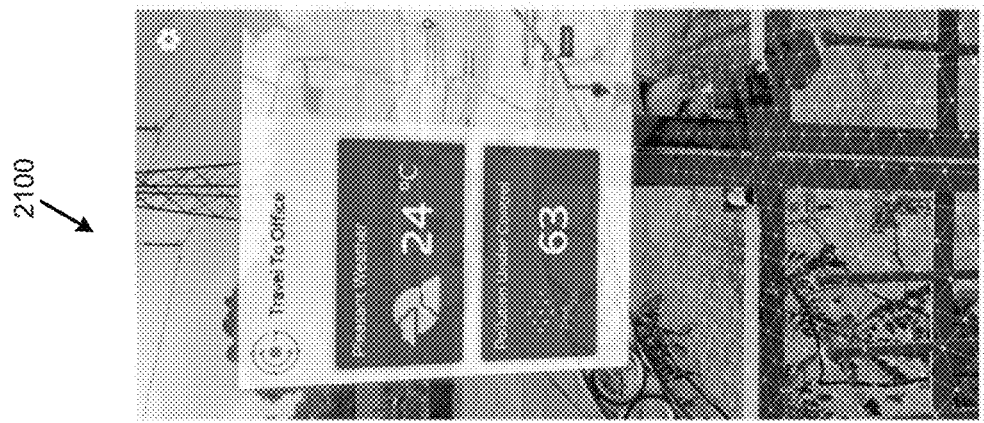
FIG. 21

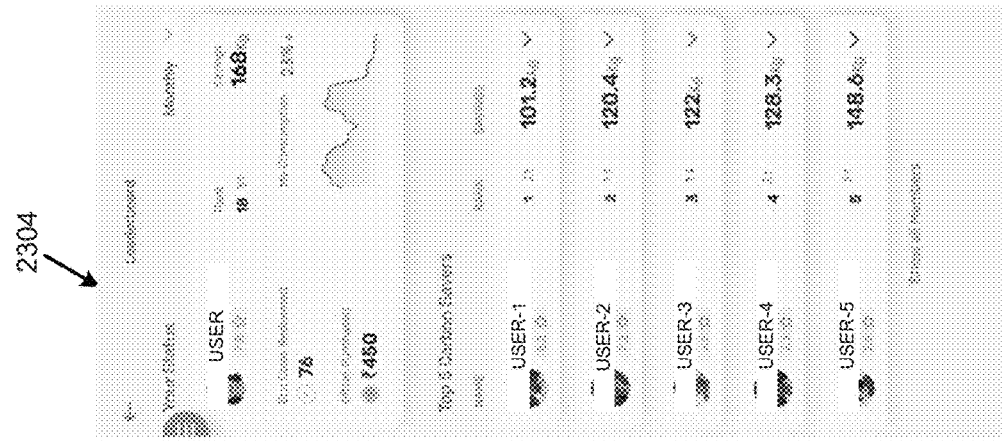
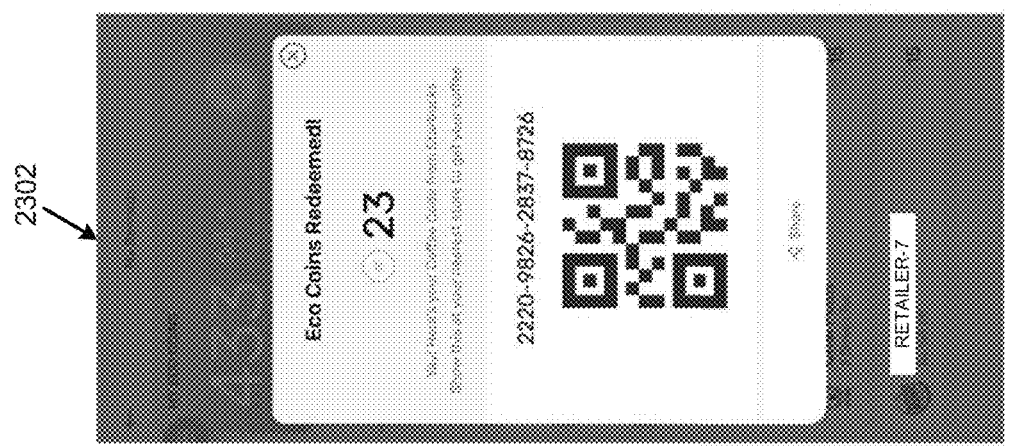
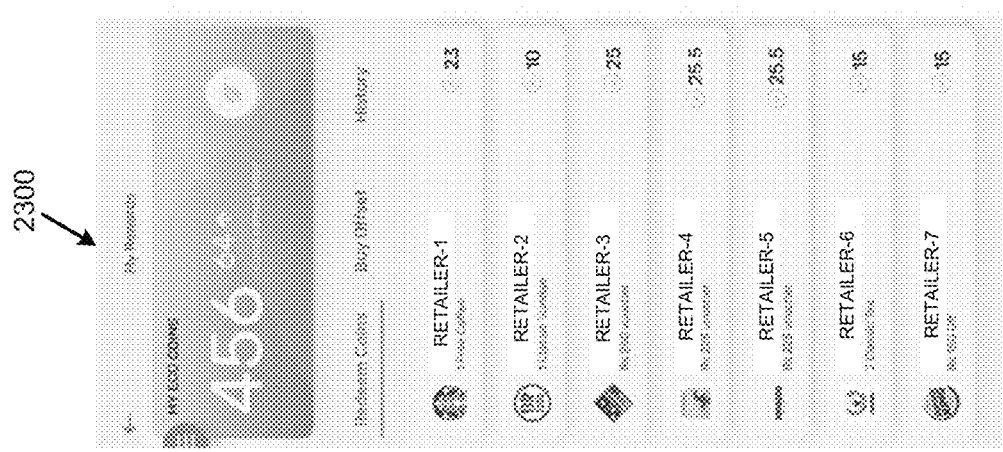
FIG. 23

2500

```
┌─────────────────────────────────────────────────────────┐
│  GENERATE, FOR A VEHICLE ASSOCIATED WITH A USER, A CARBON │
│  EMISSION QUOTA FOR USER JOURNEY CARBON FOOTPRINT         │
│                    REDUCTION                              │
│                      2502                                 │
└─────────────────────────────────────────────────────────┘
                           │
                           ▼
┌─────────────────────────────────────────────────────────┐
│    GENERATE, FOR THE VEHICLE, A PREDICTED JOURNEY CARBON  │
│         EMISSIONS FOR A SPECIFIED JOURNEY                 │
│                      2504                                 │
└─────────────────────────────────────────────────────────┘
                           │
                           ▼
┌─────────────────────────────────────────────────────────┐
│  GENERATE, BASED ON COLLABORATIVE FILTERING, AT LEAST ONE │
│  GOAL-BASED AND CONDITIONS-BASED RECOMMENDATION FOR THE   │
│  USER OF THE VEHICLE FOR THE SPECIFIED JOURNEY FOR THE USER│
│         JOURNEY CARBON FOOTPRINT REDUCTION                │
│                      2506                                 │
└─────────────────────────────────────────────────────────┘
```

FIG. 25

USER JOURNEY CARBON FOOTPRINT REDUCTION

PRIORITY

The present application claims priority under 35 U.S.C. 119(a)-(d) to Indian Provisional Patent Application number 202011043230, having a filing date of Oct. 5, 2020, the disclosure of which is hereby incorporated by reference in its entirety.

BACKGROUND

A user of a motorized vehicle such as an automobile, a motorcycle, a bus, etc., may utilize the motorized vehicle for a variety of purposes such as recreation, transportation, etc. A motorized vehicle that utilizes gas or another such combustible resource may generate carbon dioxide ($CO_2$). An amount of $CO_2$ generated by each vehicle may be described as a carbon footprint of the vehicle. The carbon footprint of each vehicle may result in an increase in overall emissions generated by such vehicles.

BRIEF DESCRIPTION OF DRAWINGS

Features of the present disclosure are illustrated by way of example and not limited in the following figure(s), in which like numerals indicate like elements, in which:

FIG. 12 illustrates further details of the journey carbon footprint analyzer to illustrate operation of the journey carbon emissions predictor of the user journey carbon footprint reduction apparatus of FIG. 1, in accordance with an example of the present disclosure;

FIG. 15 illustrates operation of a goals-based advisor of the advisory generator of the user journey carbon footprint reduction apparatus of FIG. 1, in accordance with an example of the present disclosure;

FIG. 17 illustrates operation of a dynamic carbon footprint analyzer of the real-time journey carbon emissions analyzer of the user journey carbon footprint reduction apparatus of FIG. 1, in accordance with an example of the present disclosure;

FIGS. 18-23 illustrate various user-interface displays to illustrate operation of the user journey carbon footprint reduction apparatus of FIG. 1, in accordance with an example of the present disclosure;

FIG. 25 illustrates a flowchart of an example method for user journey carbon footprint reduction in accordance with an example of the present disclosure.

DETAILED DESCRIPTION

Figure 1:
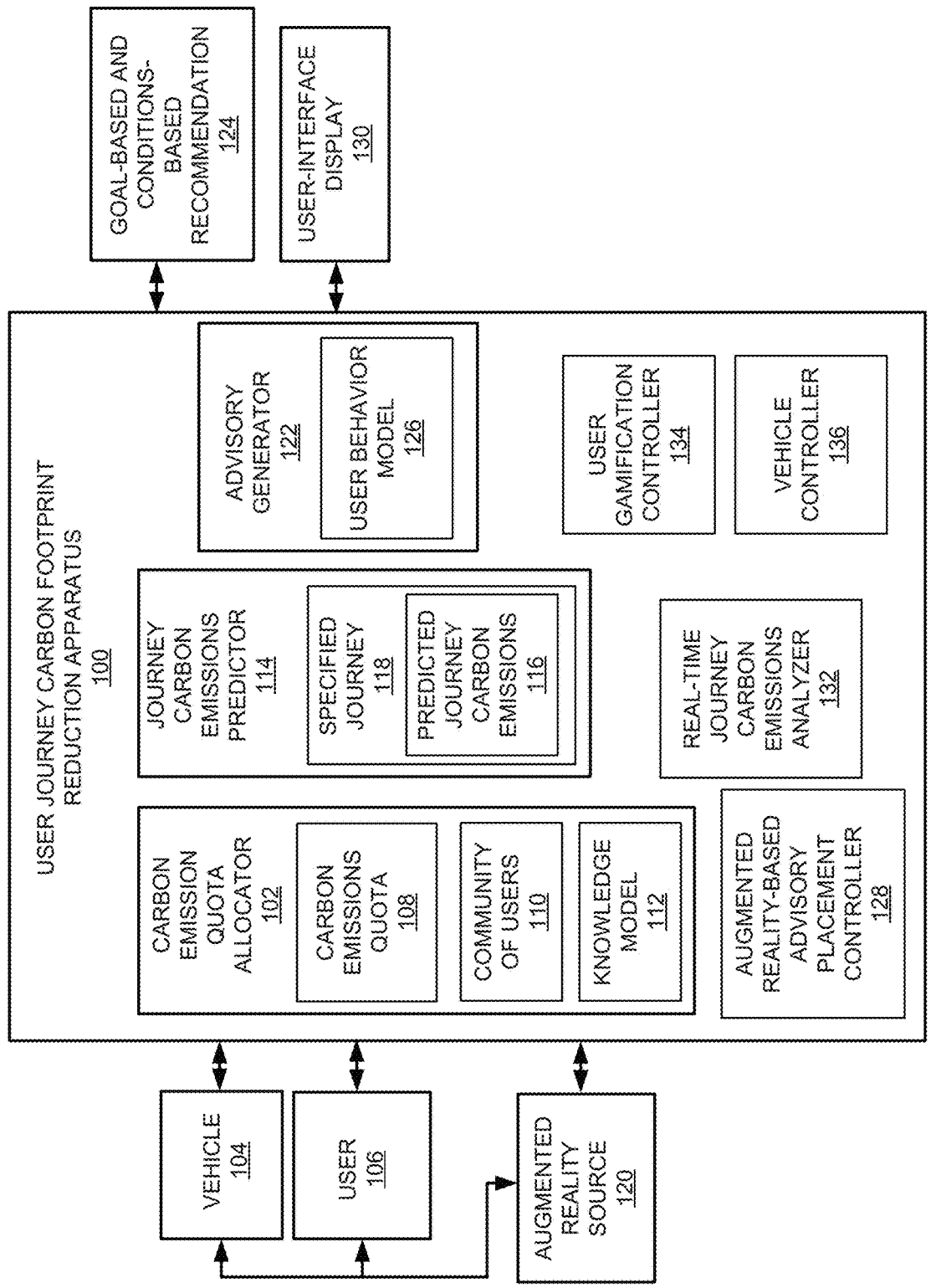
FIG. 1 illustrates a layout of a user journey carbon footprint reduction apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

User journey carbon footprint reduction apparatuses, methods for user journey carbon footprint reduction, and non-transitory computer readable media having stored thereon machine readable instructions to provide user journey carbon footprint reduction are disclosed herein. The apparatuses, methods, and non-transitory computer readable media disclosed herein provide for reduction of the carbon footprint generated by vehicles, such as personal vehicles, during a typical commute. The apparatuses, methods, and non-transitory computer readable media disclosed herein may utilize image processing and machine learning to recognize available vehicle options. Further, the apparatuses, methods, and non-transitory computer readable media disclosed herein may utilize knowledge graphs to determine the carbon footprint of a prospective journey. The apparatuses, methods, and non-transitory computer readable media disclosed herein may provide recommendations, and assist a user in selecting a greenest alternative, given current traffic, weather, and pollution conditions. The traveling activity may be tracked to provide contextual greener recommendations on driving style, routes, etc. Finally, depending upon the adoption of these recommendations, the user may be incentivized by leveraging a vendor ecosystem of green vendors, and may be further motivated to maintain adherence to these recommendations.

With respect to user journey carbon footprint reduction, as people are utilizing a greater number of transportation resources, the transportation sector represents one of the most significant contributors towards global greenhouse gas emissions. For the transportation sector, personal motor vehicles such as automobiles (e.g., cars) and two-wheel motorized vehicles account for a significant portion of the overall greenhouse gas emissions. This portion is expected to grow, and poses a significant technical challenge towards efforts to reduce greenhouse emissions.

The apparatuses, methods, and non-transitory computer readable media disclosed herein may address at least the aforementioned technical challenges by providing for empowerment of end-users towards reduction of greenhouse emissions. For journeys involving personal vehicles, multiple heterogeneous parameters may contribute towards a high carbon footprint and respective emissions. In this regard, the parameters may include vehicle model, age, manufacturing and sourcing, driving style, traffic conditions, etc. The apparatuses, methods, and non-transitory computer readable media disclosed herein may account for such parameters towards reduction of the carbon footprint generated by vehicles, such as personal vehicles, during a typical commute.

According to examples disclosed herein, the apparatuses, methods, and non-transitory computer readable media disclosed herein may provide for reduction of the overall carbon footprint and corresponding greenhouse gas emissions of a user's journey (e.g., commute) by assisting a user to be aware of the impact of the user's carbon footprint emissions, and guiding the user towards selecting alternate greener vehicles and/or other options.

According to examples disclosed herein, the apparatuses, methods, and non-transitory computer readable media disclosed herein may generate rewards for a user for adopting system-generated greener recommendations, thereby promoting and/or creating a community of such environmentally inclined users.

According to examples disclosed herein, the apparatuses, methods, and non-transitory computer readable media disclosed herein may also implement a plurality of technical components and phases to reduce carbon-emissions for other carbon-intensive activities.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example user journey carbon footprint reduction apparatus (hereinafter also referred to as "apparatus 100").

Referring to FIG. 1, the apparatus 100 may include a carbon emission quota allocator 102 that is executed by at least one hardware processor (e.g., the hardware processor 2402 of FIG. 24, and/or the hardware processor 2604 of FIG. 26) to generate, for a vehicle 104 associated with a user 106, a carbon emission quota 108 for user journey carbon footprint reduction.

A journey carbon emissions predictor 114 that is executed by at least one hardware processor (e.g., the hardware processor 2402 of FIG. 24, and/or the hardware processor 2604 of FIG. 26) may generate, for the vehicle 104, a predicted journey carbon emissions 116 for a specified journey 118.

An advisory generator 122 that is executed by at least one hardware processor (e.g., the hardware processor 2402 of FIG. 24, and/or the hardware processor 2604 of FIG. 26) may generate, based on collaborative filtering, at least one goal-based and conditions-based recommendation 124 for the user 106 of the vehicle 104 for the specified journey 118 for the user journey carbon footprint reduction.

An augmented reality-based advisory placement controller 128 that is executed by at least one hardware processor (e.g., the hardware processor 2402 of FIG. 24, and/or the hardware processor 2604 of FIG. 26) may generate, based on a user behavior model 126, a user-interface display 130 for the specified journey 118 for the user journey carbon footprint reduction.

A real-time journey carbon emissions analyzer 132 that is executed by at least one hardware processor (e.g., the hardware processor 2402 of FIG. 24, and/or the hardware processor 2604 of FIG. 26) may generate, based on the user behavior model 126, and real-time monitoring of the user 106 and the vehicle 104, a real-time update of the user-interface display 130 for the specified journey 118 for the user journey carbon footprint reduction.

According to examples disclosed herein, the carbon emission quota allocator 102 may generate, based on a community of users 110, a knowledge model 112 for the user journey carbon footprint reduction.

According to examples disclosed herein, a user gamification controller 134 that is executed by at least one hardware processor (e.g., the hardware processor 2402 of FIG. 24, and/or the hardware processor 2604 of FIG. 26) may generate, based on the real-time monitoring of the user 106 and the vehicle 104, an update to the knowledge model 112.

According to examples disclosed herein, the carbon emission quota allocator 102 may determine whether the user 106 is able to adhere to the carbon emission quota 108. Based on a determination that the user 106 is able to adhere to the carbon emission quota 108, the carbon emission quota allocator 102 may reduce the carbon emission quota 108.

According to examples disclosed herein, the carbon emission quota allocator 102 may increase, based on a determination that the user 106 is not able to adhere to the carbon emission quota 108, the carbon emission quota 108.

According to examples disclosed herein, the advisory generator 122 may generate, based on collaborative filtering, at least one goal-based and conditions-based recommendation 124 for the user 106 of the vehicle 104 for the specified journey 118 for the user journey carbon footprint reduction by generating, by a conditions-based advisor, a weather based recommendation for the user 106 of the vehicle 104 for the specified journey 118 for the user journey carbon footprint reduction.

According to examples disclosed herein, the advisory generator 122 may generate, by a goals-based advisor, a carbon quota based recommendation for the user 106 of the vehicle 104 for the specified journey 118 for the user journey carbon footprint reduction.

According to examples disclosed herein, the advisory generator 122 may generate, by a collaborative filtering-based advisor, a usage based recommendation for the user 106 of the vehicle 104 for the specified journey 118 for the user journey carbon footprint reduction.

According to examples disclosed herein, the real-time journey carbon emissions analyzer 132 may generate, based on the user behavior model 126, and real-time monitoring of the user 106 and the vehicle 104, the real-time update of the user-interface display 130 for the specified journey 118 for the user journey carbon footprint reduction by generating the real-time update of the user-interface display 130 to include alternate routes, vehicle turnoff recommendations, and driving tips.

A vehicle controller 136 that is executed by at least one hardware processor (e.g., the hardware processor 2402 of FIG. 24, and/or the hardware processor 2604 of FIG. 26) may control, based on the at least one goal-based and conditions-based recommendation 124 for the user 106 of the vehicle 104 for the specified journey 118 for the user journey carbon footprint reduction, factors such as mechanical power allocation to the vehicle 104, electrical power utilization of different components of the vehicle 104, etc. For example, if the at least one goal-based and conditions-based recommendation 124 specifies a reduced carbon emissions quota 108, mechanical power allocation to the vehicle 104, and/or electrical power utilization of different components of the vehicle 104, may be similarly reduced. Similarly, if the at least one goal-based and conditions-based recommendation 124 specifies an increased carbon emissions quota 108, mechanical power allocation to the vehicle 104, and/or electrical power utilization of different components of the vehicle 104, may be similarly increased. In this regard, the decrease or increase may be proportional to an initial carbon emissions quota 108, versus a reduced or increased carbon emissions quota 108.

Figure 2:
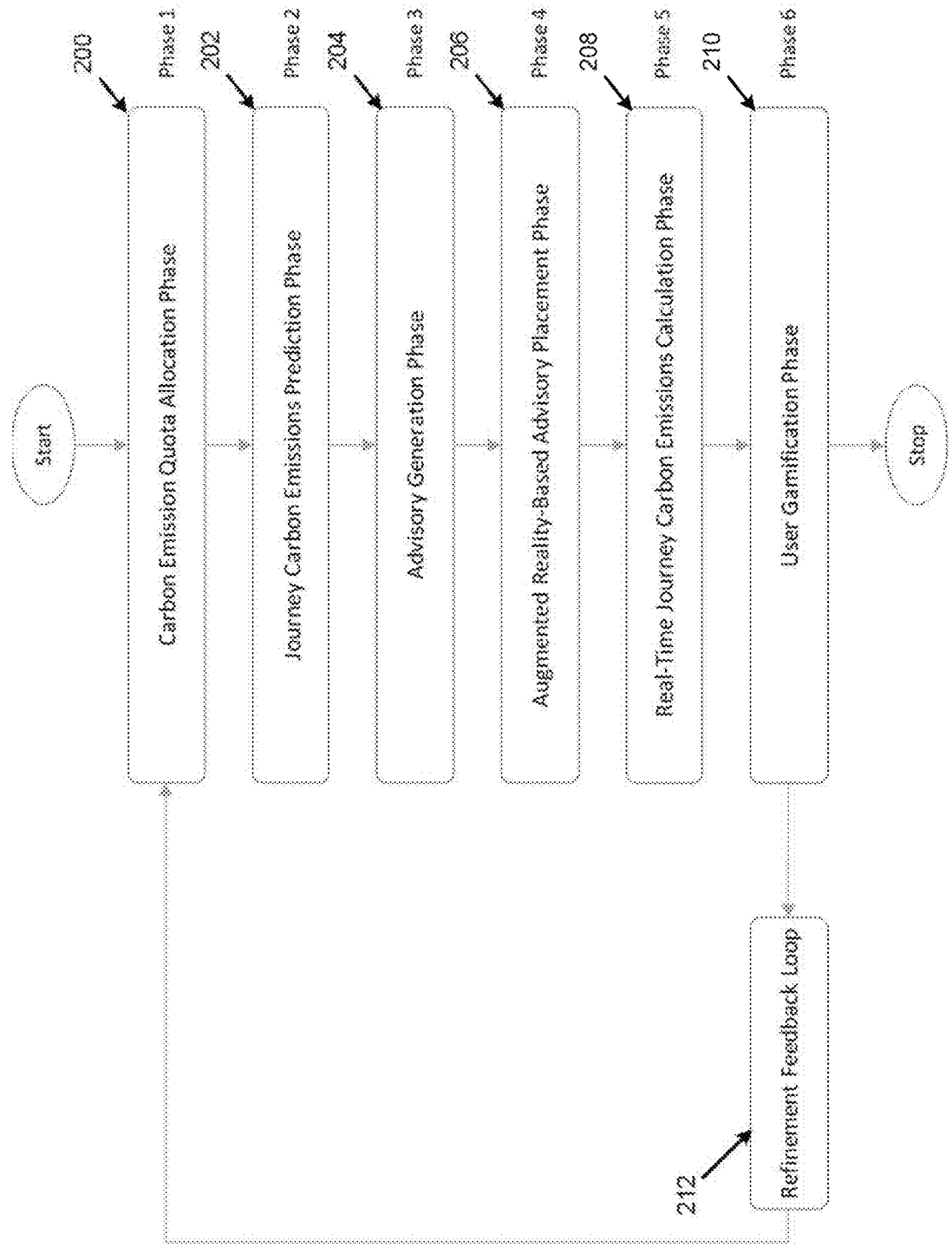
FIG. 2 illustrates a logical flow to illustrate operation of the user journey carbon footprint reduction apparatus of FIG. 1, in accordance with an example of the present disclosure.

FIG. 2 illustrates a logical flow to illustrate operation of the apparatus 100, in accordance with an example of the present disclosure.

Referring to FIG. 2, at 200, the carbon emission quota allocator 102 of a first phase (e.g., Phase 1) of operation of the apparatus 100 may generate, for a vehicle 104 associated with a user 106, a carbon emission quota 108 (e.g., carbon allowance) for user journey carbon footprint reduction. In some examples and in this regard, a community creator (not shown) of the apparatus 100 (e.g., of the carbon emission quota allocator 102) may generate a community of users 110 for user journey carbon footprint reduction. In this regard, a knowledge modeler (not shown) of the apparatus 100 (e.g., of the carbon emission quota allocator 102) may generate, based on the community of users 110, a knowledge model 112 for the user journey carbon footprint reduction. The carbon emission quota allocator 102 may also be denoted a carbon allowance analyzer.

At 202, the journey carbon emissions predictor 114 of a second phase (e.g., Phase 2) of operation of the apparatus 100 may generate, for the vehicle 104, the predicted journey carbon emissions 116 for a specified journey 118. In this regard, a vehicle detector and analyzer (not shown) of the apparatus 100 (e.g., of the journey carbon emissions predictor 114) may identify, based on input from an augmented reality source 120, the vehicle 104 associated with a user xx of the community of users 110 for the user journey carbon footprint reduction. In some examples, the vehicle detector and analyzer may determine, for the identified vehicle 104, a plurality of attributes for the user journey carbon footprint reduction.

At 204, the advisory generator 122 of a third phase (e.g., Phase 3) of operation of the apparatus 100 may generate, based on collaborative filtering, at least one goal-based and conditions-based recommendation 124 for the user 106 of the vehicle 104 for the specified journey 118 for the user journey carbon footprint reduction. An equivalency and metaphor analyzer (not shown) of the apparatus 100 (e.g., of the advisory generator 122) may generate, based on the at least one goal-based and conditions-based recommendation 124, a user behavior model 126 for the user journey carbon footprint reduction.

At 206, the augmented reality-based advisory placement controller 128 of a fourth phase (e.g., Phase 4) of operation of the apparatus 100 may generate, based on the user behavior model 126, a user-interface display 130 for the specified journey 118 for the user journey carbon footprint reduction. The augmented reality-based advisory placement controller 128 may also be denoted a data visualizer and augmented reality spatial placement analyzer.

At 208, the real-time journey carbon emissions analyzer 132 of a fifth phase (e.g., Phase 5) of operation of the apparatus 100 may generate, based on the user behavior model 126, and real-time monitoring of the user 106 and the vehicle 104, a real-time update of the user-interface display 130 for the specified journey 118 for the user journey carbon footprint reduction.

At 210, the user gamification controller 134 of a sixth phase (e.g., Phase 6) of operation of the apparatus 100 may generate, based on the real-time monitoring of the user 106 and the vehicle 104, an update to the knowledge model 112. The user gamification controller 134 may also be denoted a gamification and carbon neutralizer. With respect to gamification, depending upon the carbon footprint determination, as well as associated recommendations and their acceptance/rejection, the user 106 may be allocated certain game points/badges/rewards (e.g., game elements as disclosed herein).

At 212, the refinement feedback loop may provide feedback for improvement of accuracy of operation of the apparatus 100.

Figure 3:
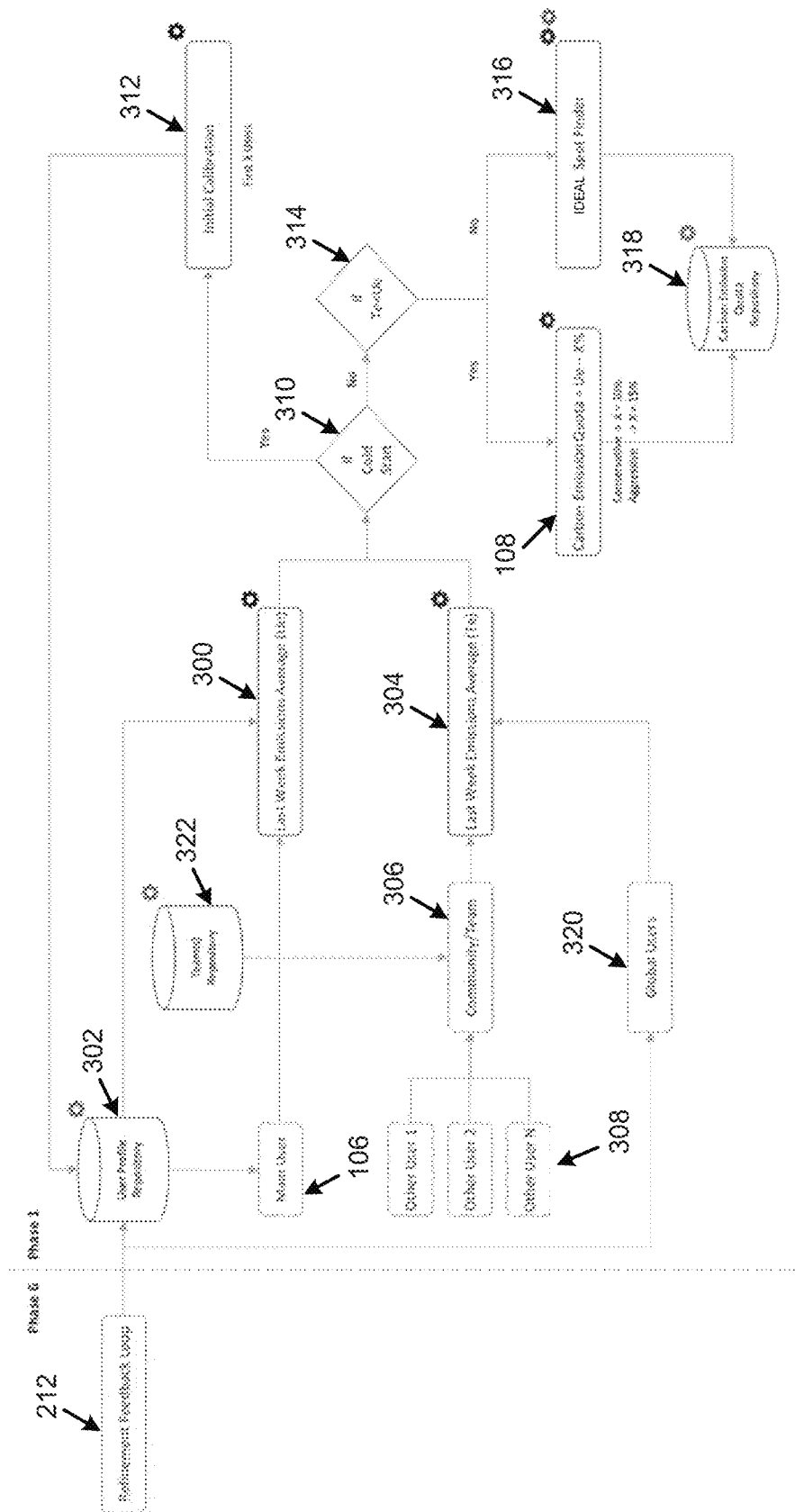
FIG. 3 illustrates a logical flow to illustrate operation of a carbon emission quota allocator of the user journey carbon footprint reduction apparatus of FIG. 1, in accordance with an example of the present disclosure.

FIG. 3 illustrates a logical flow to illustrate operation of the carbon emission quota allocator 102, in accordance with an example of the present disclosure.

Referring to FIG. 3, the carbon emission quota allocator 102 of a first phase (e.g., Phase 1) of operation of the apparatus 100 may generate, for a vehicle 104 associated with a user 106, a carbon emission quota 108 (e.g., carbon allowance) for user journey carbon footprint reduction. In this regard, at 300, a last week emissions average (Ue) may be determined based on input from a user profile repository 302, and the user 106. At 304, a last week emissions average (Te) may be determined for a community team 306 (stored in a teams repository 322) including other users 1-N at 308, and global users 320. At 310, based on a cold start (e.g., a state when less number of users are using the apparatus 100, for example, at initial launch), an initial calibration may be performed at 312. The initial calibration may be used to assign the carbon emissions quota 108 when the number of users using the apparatus 100 is reduced (e.g., the first hundred users). In this case, determining the last week's emission average 304 may not be correct, because of the reduced number of users. Hence, in the initial calibration phase, the user 106 may be assigned a default, pre-determined carbon emissions quota 108. This default number may be based upon the global average carbon footprint per capita for food consumption (e.g., based upon existing research in this area)]. At 314, if Te from 304 is less than Ue from 300, the carbon emission quota allocator 102 may generate the carbon emission quota 108 as Ue–X %. For example, if Te 304 was determined to be 3 Kg CO2e, the carbon emissions quota 108 for the next week will be 2.7 Kg CO2e (if the user selected a conservative option) or 2.55 Kg CO2e (if the user selected an aggressive option)]. For a conservative assessment, X may be specified as 10%, or may be otherwise specified as 15% or another value. At 316, an ideal spot finder may determine an ideal carbon emissions quota range for the vehicle 104. For example, if Te>Ue, this refers to the scenario that user 106 is emitting a lesser carbon footprint than the team average 304. In this case, it may not be certain whether the user will be able to adhere to a carbon emissions quota that is lower than the team average Te. Hence, the carbon emissions quota may be reduced at first by X %, and in the next iteration, if the user is unable to adhere to this new emissions quota, it may be reverted to the previously allocated carbon emissions quota. This carbon emissions quota range between Ue and Ue–X % may be referred to as the ideal spot (only when Te>Ue). An example scenario is explained in FIG. 9. At 318, the carbon emission quota 108 may be stored in a carbon emission quota repository.

Figure 4:
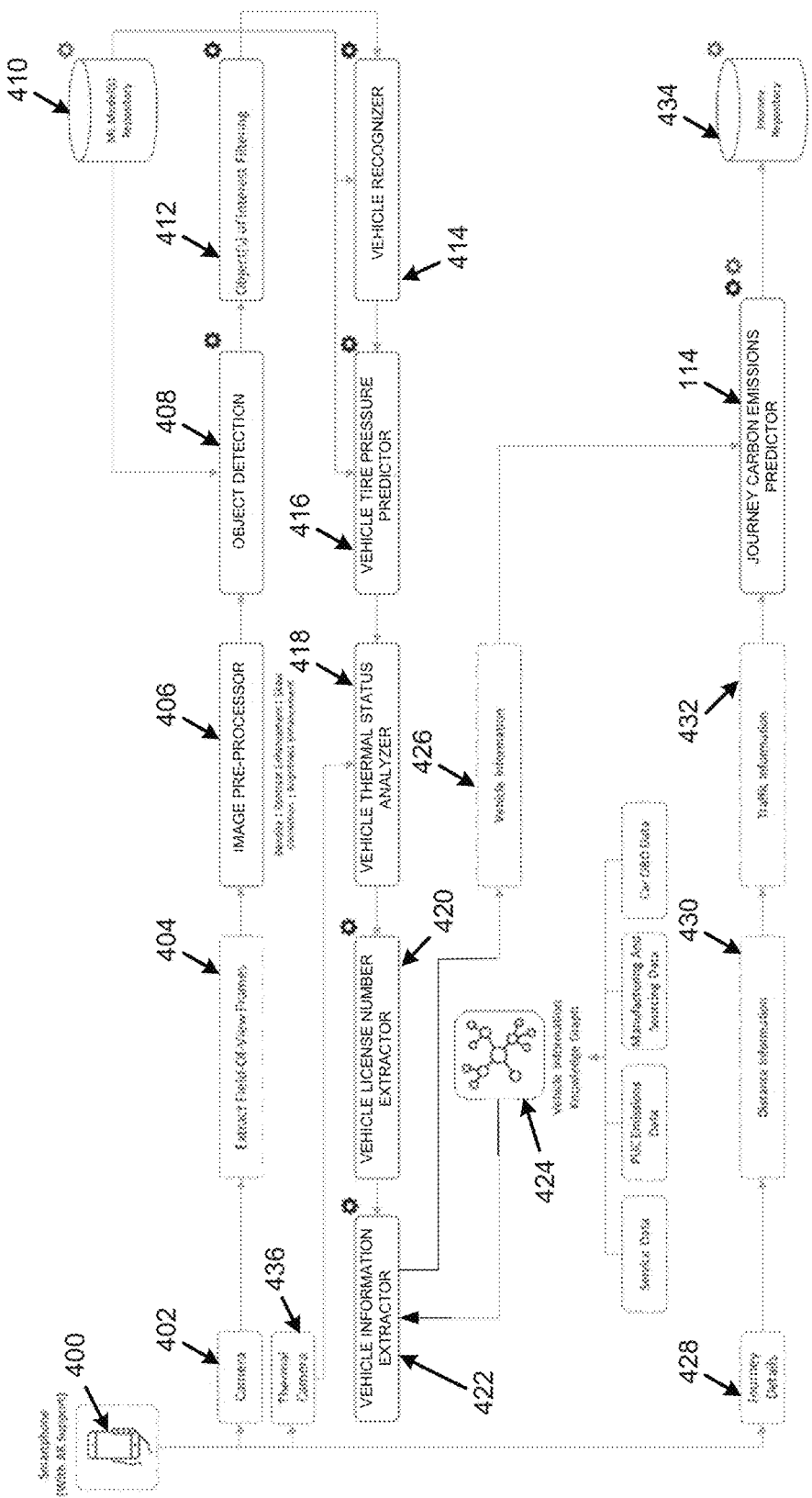
FIG. 4 illustrates a logical flow to illustrate operation of a journey carbon emissions predictor of the user journey carbon footprint reduction apparatus of FIG. 1, in accordance with an example of the present disclosure.

FIG. 4 illustrates a logical flow to illustrate operation of the journey carbon emissions predictor 114, in accordance with an example of the present disclosure.

Referring to FIG. 4, the journey carbon emissions predictor 114 of a second phase (e.g., Phase 2) of operation of the apparatus 100 may generate, for the vehicle 104, the predicted journey carbon emissions 116 for a specified journey 118.

At 400, a device, such as a smartphone with augmented reality support, may include a camera 402 which may be used to extract field-of-view frames 404 for the vehicle 104. The field-of-view frames may refer to a constant stream of images captured using the smartphone camera 402 (e.g., 24 frames per second). At 406, an image pre-processer of the journey carbon emissions predictor 114 may perform operations such as denoising, contrast enhancement, skew correction, and brightness enhancement on the image of the vehicle 104. At 408, object detection (e.g., vehicle, motorcycle, bicycle, tree, road, house, etc. detection) may be performed on the pre-processed image from block 406, and based on a machine learning model from machine learning model repository 410. At 412, object(s) of interest filtering may be performed on the objects detected at block 408. In this regard, objects belonging to categories (e.g., car, motorcycle, bicycle, bus, etc.) may be filtered. Output of the machine learning model repository 410 and filtered objects from block 412 may be received by a vehicle recognizer at block 414. Output of the machine learning model repository 410 and the vehicle recognizer at block 414 may be received by a vehicle tire pressure predictor at block 416, which may feed into a vehicle thermal status analyzer at block 418 (along with thermal information regarding the vehicle 104 from thermal camera 436) to analyze a thermal status (e.g., temperature) of the vehicle 104. For example, the thermal status may specify whether the vehicle is currently hot or cold (depending upon if it has been recently driven. Output of the vehicle terminal status analyzer at block 418 may feed into a vehicle license number extractor at block 420, which may feed into a vehicle information extractor at block 422. The vehicle information extracted at block 422 may be determined from a vehicle information knowledge graph at block 424, and output as vehicle information at block 426 that is fed into the journey carbon emissions predictor 114. The extracted vehicle Information 426 may include service records, emissions records, manufacturing details, car on-board diagnostics information, etc. The vehicle information knowledge graph at block 424 may also receive information such as service data, emissions data, manufacturing and sourcing data, and vehicle on-board diagnostics (OBD) data. The journey carbon emissions predictor 114 may also receive information such as journey details 428, distance information 430, and traffic information 432. Output of the journey carbon emissions predictor 114 may be stored in journey repository 434.

Figure 5:
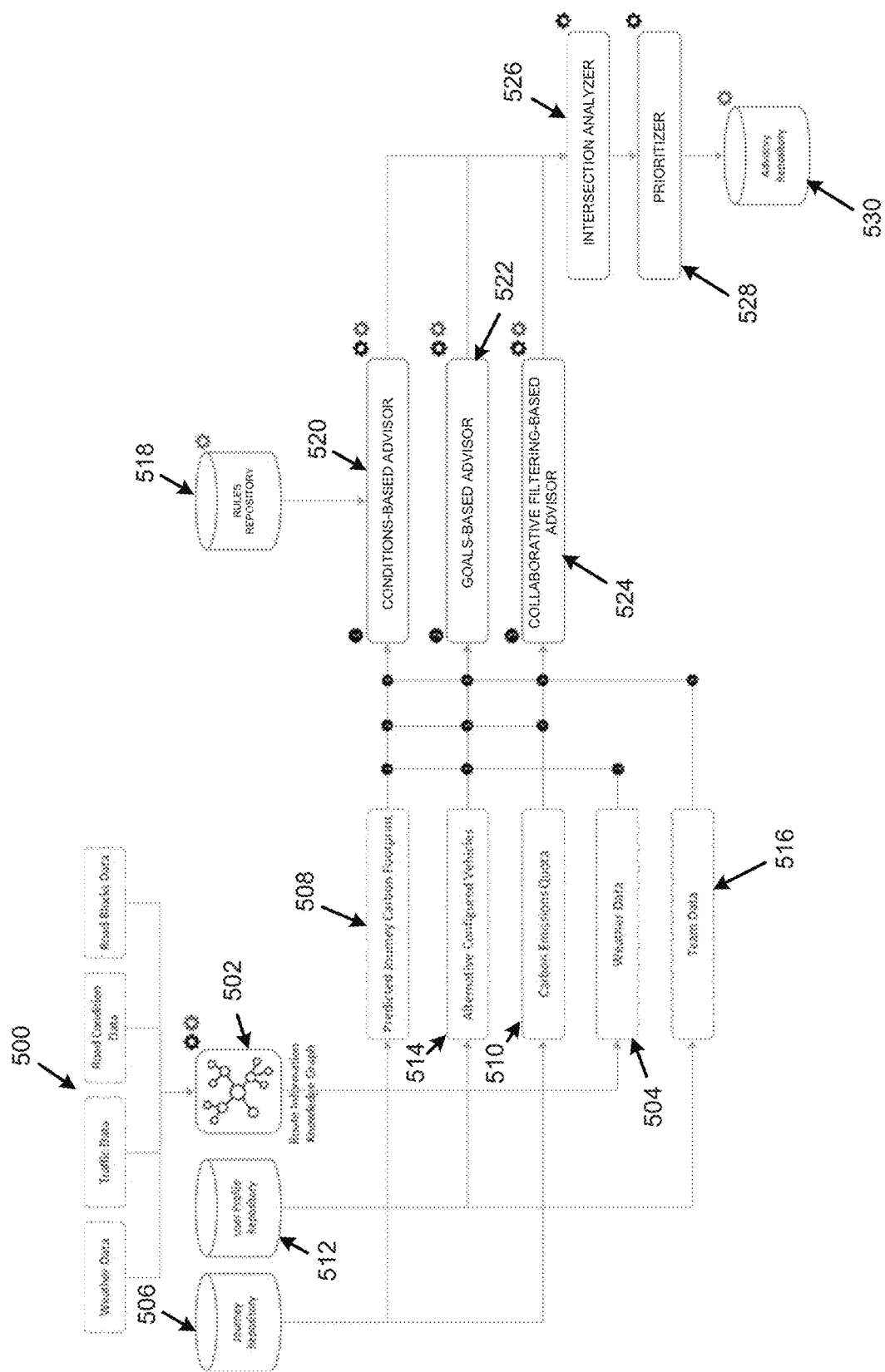
FIG. 5 illustrates a logical flow to illustrate operation of an advisory generator of the user journey carbon footprint reduction apparatus of FIG. 1, in accordance with an example of the present disclosure.

FIG. 5 illustrates a logical flow to illustrate operation of the advisory generator 122, in accordance with an example of the present disclosure.

Referring to FIG. 5, the advisory generator 122 of a third phase (e.g., Phase 3) of operation of the apparatus 100 may generate, based on collaborative filtering, at least one goal-based and conditions-based recommendation 124 for the user 106 of the vehicle 104 for the specified journey 118 for the user journey carbon footprint reduction.

In this regard, the advisory generator 122 may start by first analyzing information such as weather data, traffic data, road condition data, and roadblocks data at 500, and this information may be used to determine a route information knowledge graph at 502. The route information knowledge graph at 502 may be used to extract weather data at 504. Journey information from journey repository 506 may be analyzed to extract predicted journey carbon footprint 508 and carbon emissions quota 510. User profile information from the user profile repository 512 may be analyzed to extract alternative configured vehicles 514 and team data 516. With respect to alternative configured vehicles 514, a user may configure the vehicles that the user owns/rents and uses for a journey. For example, the user may configure a car, a motorcycle, a bicycle, etc. as alternate configured vehicles that may be leveraged for a journey. The predicted journey carbon footprint 508, the alternative configured vehicles 514, weather data 504, and rules information from rules repository 518 may be fed to a conditions-based advisor 520 of the advisory generator 122. An example of analysis performed by the conditions-based advisor 520 is disclosed herein with respect to FIG. 14. For example, if the weather is pleasant and the travel distance is short, the user may be recommended to drive a motorcycle or bicycle, instead of a four-wheeler. Output from a goals based advisor 522 and collaborative filtering based advisor 524 of the advisory generator 122 may be fed to an intersection analyzer 526. Further details of operation of the goals-based advisor 522 and the collaborative filtering based advisor 524 are disclosed herein with respect to FIGS. 15 and 16 respectively. The goals-based advisor 522 may recommend the vehicle based upon the carbon emissions quota left for the day. For example, if until evening, the user has already exhausted the allocated carbon emissions quota. Hence, the user may be recommended to travel next via bicycle, in order to not exceed the allocated carbon quota. The collaborative filtering based advisor 524 may analyze the vehicles leveraged by other members of the team for their respective commutes, and if appropriate, recommend a low carbon footprint vehicle alternative to the user. For example, if most of the user's team members are traveling via a low (e.g., zero) carbon-emitting bicycle, the user may be recommended to leverage the same as well for current/future journeys. Output of the intersection analyzer 526 may be fed to a prioritizer 528, and output of the prioritizer 528 may be stored in advisory repository 530. The intersection analyzer 526 may analyze the output of all three advisors to find a common subset of recommendations. This subset may then be feed into the prioritizer 528, which will prioritize these recommendations in an intelligent order, to be then shown to the user. For example, the ordering may be in ascending order of the estimated carbon footprint of the journey, if that vehicle is used.

Figure 6:
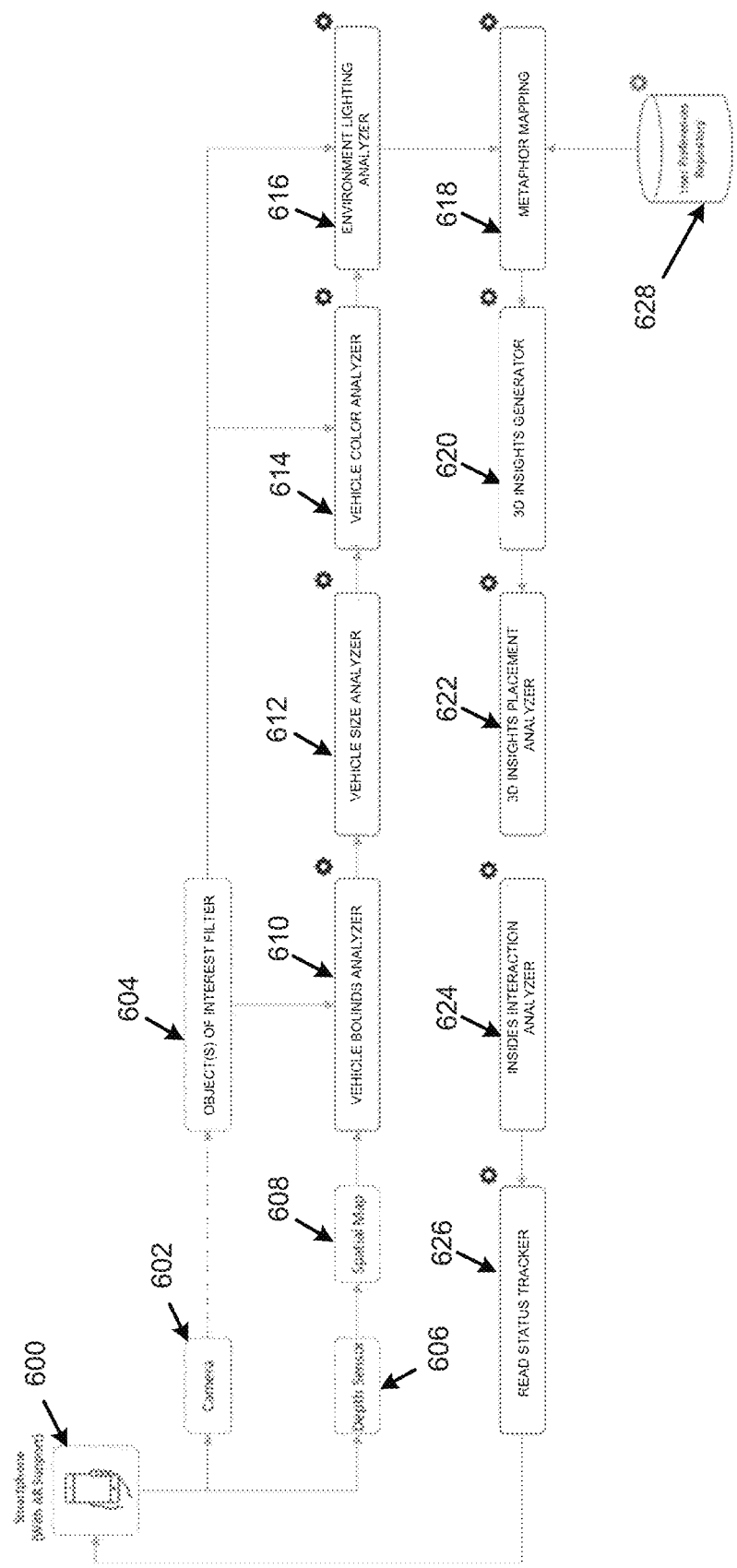
FIG. 6 illustrates a logical flow to illustrate operation of an augmented reality-based advisory placement controller of the user journey carbon footprint reduction apparatus of FIG. 1, in accordance with an example of the present disclosure.

FIG. 6 illustrates a logical flow to illustrate operation of the augmented reality-based advisory placement controller 128, in accordance with an example of the present disclosure.

Referring to FIG. 6, the augmented reality-based advisory placement controller 128 of a fourth phase (e.g., Phase 4) of operation of the apparatus 100 may generate, based on the user behavior model 126, a user-interface display 130 for the specified journey 118 for the user journey carbon footprint reduction.

In this regard, operation of the augmented reality-based advisory placement controller 128 may commence at 600 on a device, such as a smart phone with augmented reality support. The smart phone may include a camera 602 that may be used to capture images which may be fed to an objects of interest filter 604. The smart phone may further include a depth sensor 606 that may be used to determine a spatial map 608 with respect to the vehicle 104. Information from the spatial map 608 and objects of interest filter 604 may be fed to a vehicle bounds analyzer 610 that may analyze a bounds associated with the vehicle 104. Further processing may include determination of a vehicle size by a vehicle size analyzer 612, a vehicle color by a vehicle color analyzer 614, and environment lighting by an environment lighting analyzer 616. Further processing may include metaphor mapping by a metaphor mapper 618. Metaphor mapping may be used to showcase the impact of a journey's carbon footprint in terms of equivalent metaphors. For example, the number of trees required to offset/neutralize this respective carbon footprint. Alternatively, equivalent to lighting X number of electric bulbs for Y number of days. This metaphor mapping may be based upon the user's preferences (what metaphor the user can best relate with, to understand the impact on the environment). Further processing may include 3D insights generation by 3D insights generator 620. 3D insights generation may be responsible for creating a visual representation of the advisory data that is to be shown to the user (e.g., the virtual billboard on top of the car, as in 2104). Further processing may include 3D insights placement by the 3D insights placement analyzer 622, where 3D insights placement is responsible for identifying an optimal position to place the 3D insight and thereafter place the 3D insight in the user's field-of-view using, for example, augmented reality. Augmented reality may include, for example, placing the 3D insight on top of the vehicle to avoid occlusion, as in 2104 of FIG. 21. Further processing may include insights interaction determination by an insights interaction analyzer 624, which may be responsible for providing support for interacting with the 3D insight. For example, insights interaction may include showcasing additional information by gazing at a particular point on the 3D insight for a long time (e.g., a mouse hover in the 2D world). Alternatively, insights interaction may include changing the metaphor by tapping on it (e.g., a mouse click in the 2D world). Further processing may include read status tracking by a read status tracker 626. For example, read status tracking may include tracking a user's gaze or more specifically a smartphone camera's gaze, to figure out whether the user has even looked at the 3D insight or not, and if yes, how much time the user has spent in reading/understanding the insight. The metaphor mapping 618 may receive user preface information from user preference repository 628.

Figure 7:
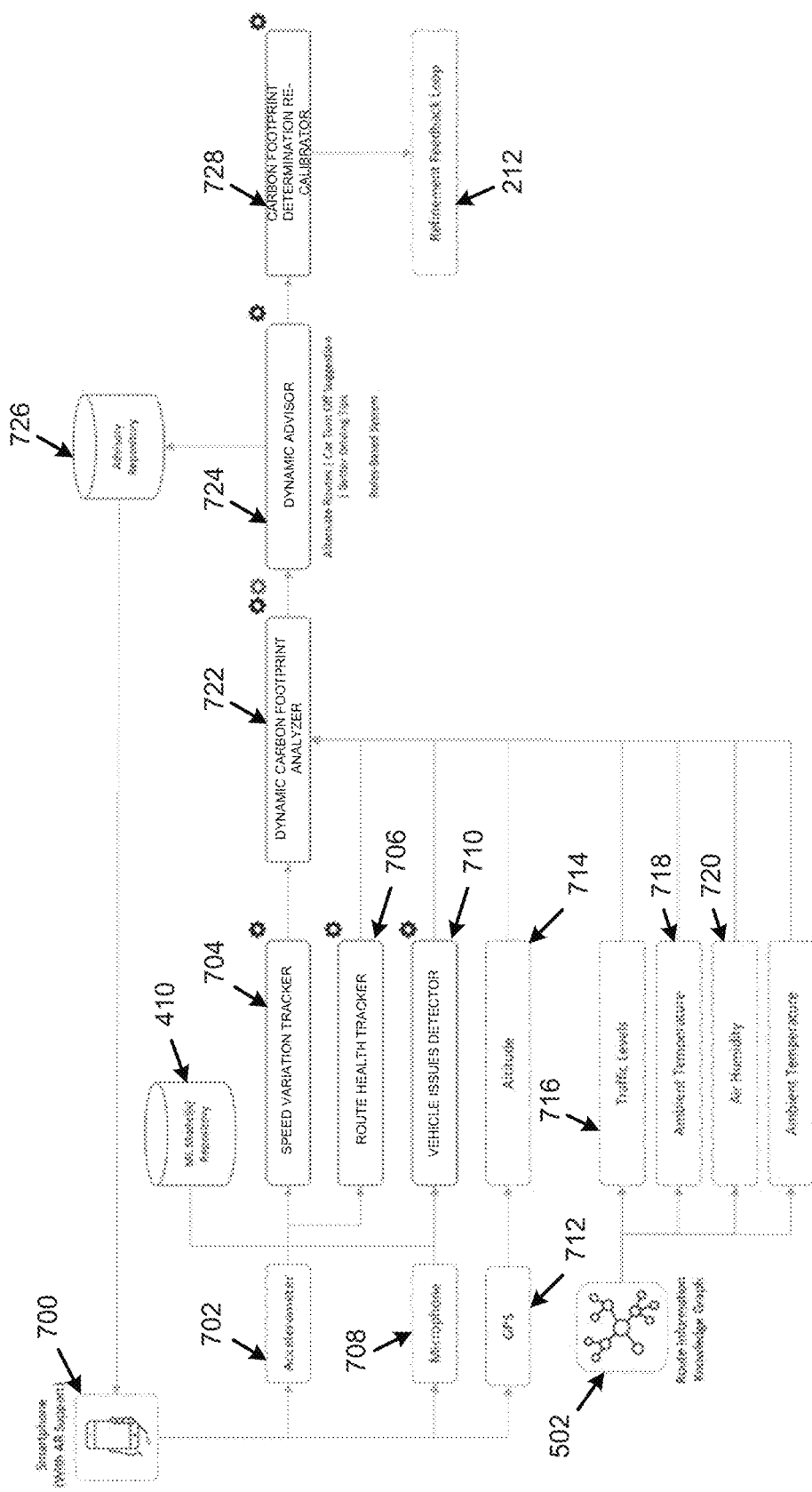
FIG. 7 illustrates a logical flow to illustrate operation of a real-time journey carbon emissions analyzer of the user journey carbon footprint reduction apparatus of FIG. 1, in accordance with an example of the present disclosure.

FIG. 7 illustrates a logical flow to illustrate operation of the real-time journey carbon emissions analyzer 132, in accordance with an example of the present disclosure.

Referring to FIG. 7, the real-time journey carbon emissions analyzer 132 of a fifth phase (e.g., Phase 5) of operation of the apparatus 100 may generate, based on the user behavior model 126, and real-time monitoring of the user 106 and the vehicle 104, a real-time update of the user-interface display 130 for the specified journey 118 for the user journey carbon footprint reduction.

In this regard, operation of the real-time journey carbon emissions analyzer 132 may commence at 700 on a device, such as a smart phone with augmented reality support. The smart phone may include an accelerometer 702 that may feed into a speed variation tracker 704, and a route health tracker 706. The smart phone may further include a microphone 708 that feeds into the vehicle issues detector 710, which receives information from machine learning model repository 410. Examples of vehicle issues may include detecting exhaust pipe blockage, engine misfires, etc. The smart phone may further include a global positioning system (GPS) unit 712 that provides altitude information 714. The route information knowledge graph 502 may be used to determine information such as traffic levels 716, ambient temperature 718, and air humidity 720. The aforementioned information may be fed to a dynamic carbon footprint analyzer 722, which may feed into a dynamic advisor 724 that determines alternate routes, provides vehicle turnoff recommendations, and improved driving tips. With respect to determination of alternate routes, vehicle turnoff recommendations, and improved driving tips, the dynamic advisor 724 may include pre-specified rules to determine what actions to take, depending upon the incoming data. For example, if the traffic on the current route is heavy, the dynamic advisor 724 may be configured to suggest an alternate longer, but faster route, if the calculated carbon footprint of the alternate route is less than the current route. Also, if the vehicle is standing still for a relatively long time, but still running, the dynamic advisor 724 may notify the user to turn off the vehicle to reduce the carbon footprint. Finally, the dynamic advisor 724 may recommend the user to avoid harsh/sudden braking and acceleration in order to reduce the carbon footprint. All these rules may be pre-configured into the dynamic advisor 724. Results from the dynamic advisor 724 may be fed to an advisory repository 726. At 728, carbon footprint determination recalibration may be performed, and the results may be fed to refinement feedback loop 212. With respect to carbon footprint determination recalibration, depending upon the user's driving style, typical route traffic, and other identified patterns, the subsequent carbon footprint calculations may be re-calibrated, for example by increasing the user's journey carbon footprint estimation by X %, if the user consistently drives badly (sudden and harsh braking/acceleration).

Figure 8:
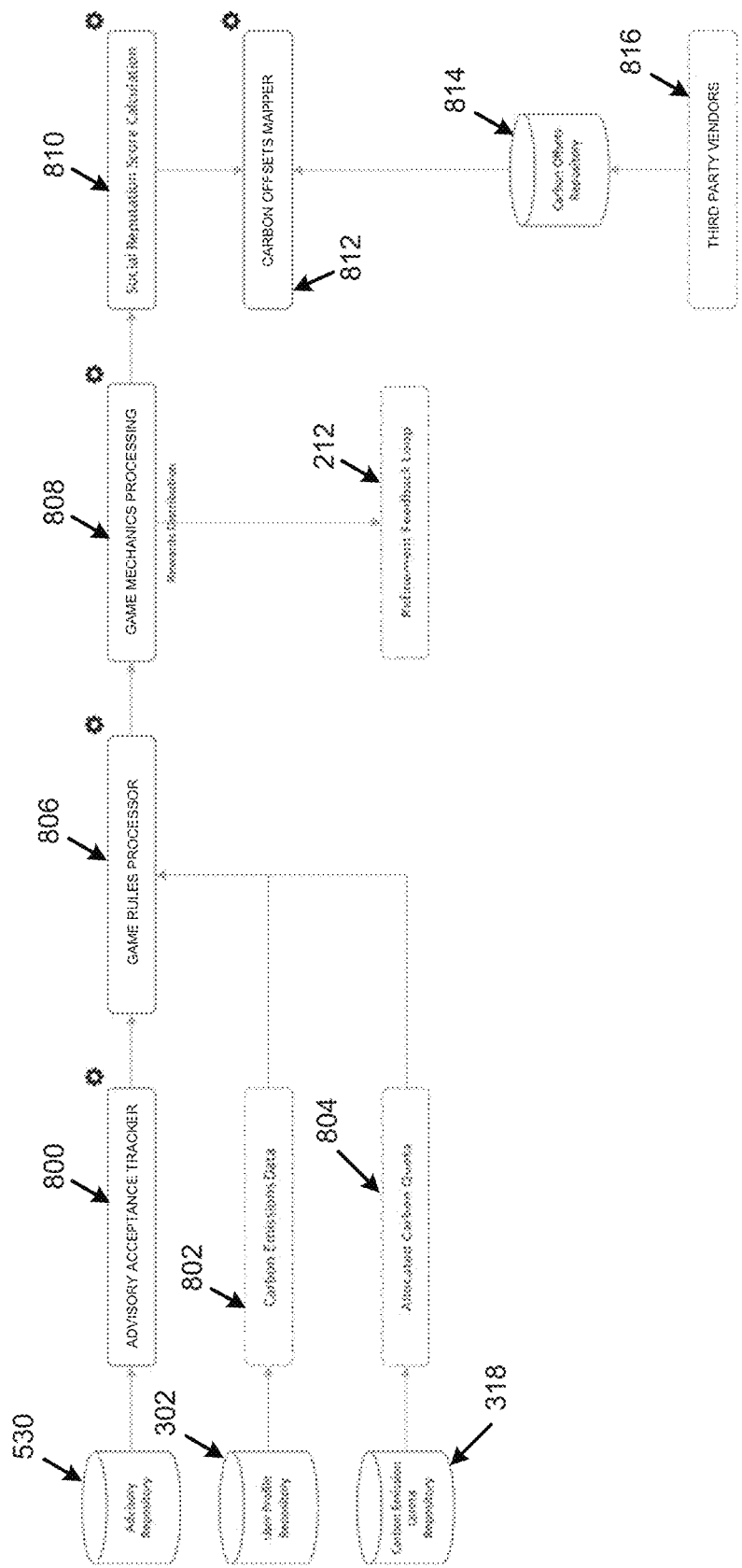
FIG. 8 illustrates a logical flow to illustrate operation of a user gamification controller of the user journey carbon footprint reduction apparatus of FIG. 1, in accordance with an example of the present disclosure.

FIG. 8 illustrates a logical flow to illustrate operation of the user gamification controller 134, in accordance with an example of the present disclosure.

Referring to FIG. 8, the user gamification controller 134 of a sixth phase (e.g., Phase 6) of operation of the apparatus 100 may generate, based on the real-time monitoring of the user 106 and the vehicle 104, an update to the knowledge model 112.

In this regard, an advisory acceptance tracker 800, carbon emissions data 802, and allocated carbon quota 804 may be fed to a game rules processor 806. The advisory acceptance tracker 800 may track whether the user has accepted the various forms of recommendations or not. For example, vehicle recommendations, driving tips, alternate suggested routes, etc. The games rules processor 806 may be rules-based and determine the new state of game elements (e.g., points, badges, levels), based upon the user's decisions. Output of the game rules processor 806 may be fed to game mechanics processor 808, output of which may be fed to refinement feedback loop 212. The game mechanics processor 808 may achieve the game's new state, as determined by the game rules processor 806, such as, for example, actual distribution of points into the user's game account/wallet. Output of the game mechanics processor 808 may be used for social reputation score determination 810, and the determined social reputation score may be fed to the carbon offsets mapper 812. The carbon offsets mapper 812 may map the points earned by a user to respective carbon offset avenues/options. For example, a user may use X number of points to offset their generated carbon footprint by planting Y number of trees in a remote location or supporting the building of a wind energy farm. This feature may not be linked with the social score reputation calculation, and both may be performed in parallel. Output of the carbon offsets mapper 812 may be stored in a carbon offsets repository 814, which may also receive input from third-party vendors 816. Input received from third-party vendors 816 may include what options are currently available for them for offsetting the carbon footprint, the cost of each option, and carbon offsetting that can be achieved by opting for it (e.g., planting trees, building wind farms, supporting community wastage reduction projects, etc.).

Figure 9:
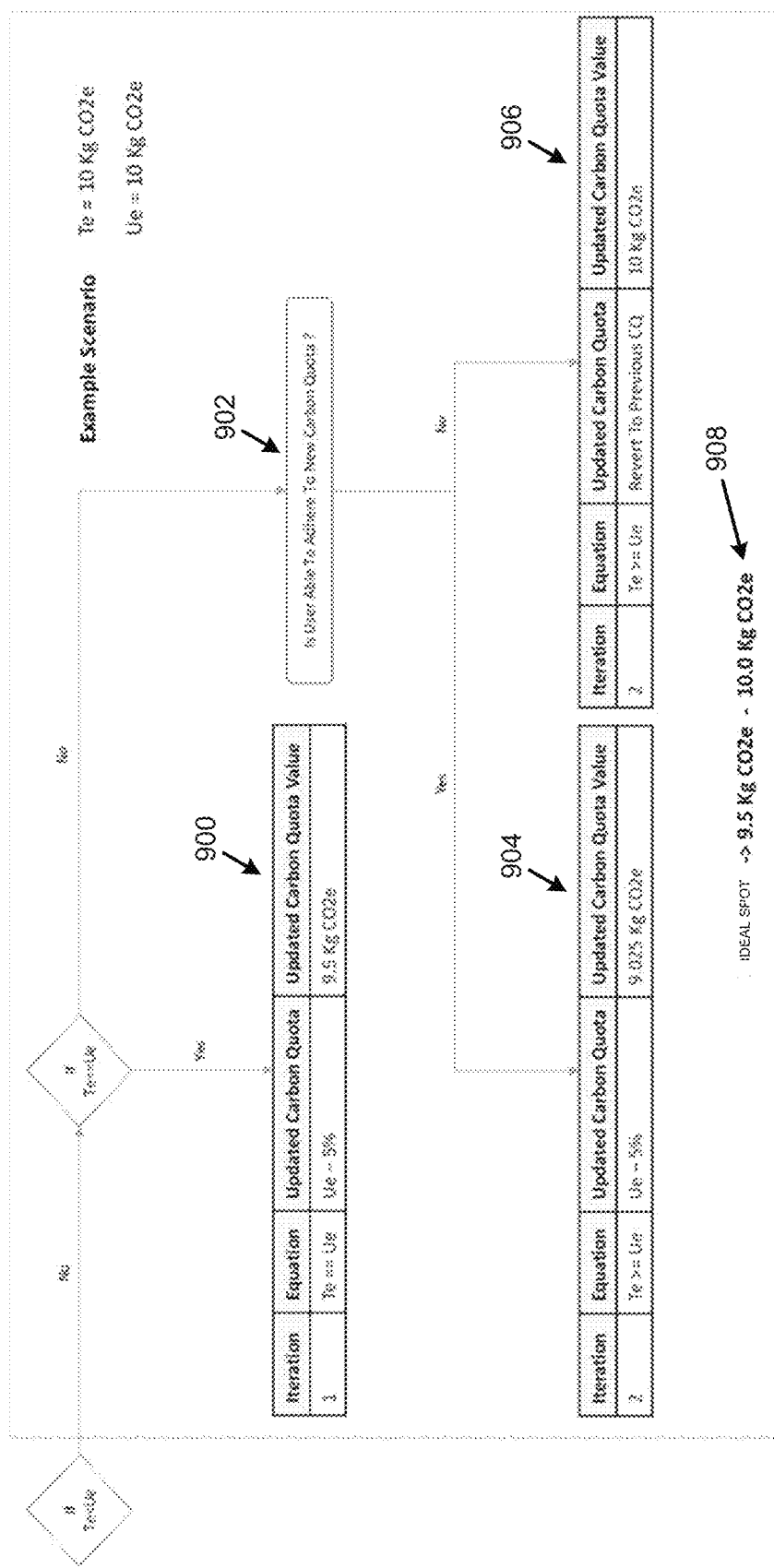
FIG. 9 illustrates a logical flow of an ideal spot finder of the carbon emission quota allocator of the user journey carbon footprint reduction apparatus of FIG. 1, in accordance with an example of the present disclosure.

FIG. 9 illustrates a logical flow of an ideal spot finder of the carbon emission quota allocator 102, in accordance with an example of the present disclosure.

Referring to FIG. 9, as disclosed herein, the carbon emission quota allocator 102 of the first phase (e.g., Phase 1) of operation of the apparatus 100 may generate, for the vehicle 104 associated with the user 106, the carbon emission quota 108 (e.g., carbon allowance) for user journey carbon footprint reduction. In this regard, for a first iteration at 900, for Te=10 Kg CO2e, and Ue=10 Kg CO2e, an updated carbon quota value may be specified as 9.5 Kg CO2e. Based on a determination at 902 of that a user is able to adhere to the new carbon quota, at 904, the updated carbon quota value may be specified as 9.025 Kg CO2e, whereas at 906, the updated carbon quota value may be specified as 10 Kg CO2e. The ideal spot, as noted at 908, may be specified as 9.5 Kg $CO_2$e-10.0 Kg CO2e.

Figure 10:
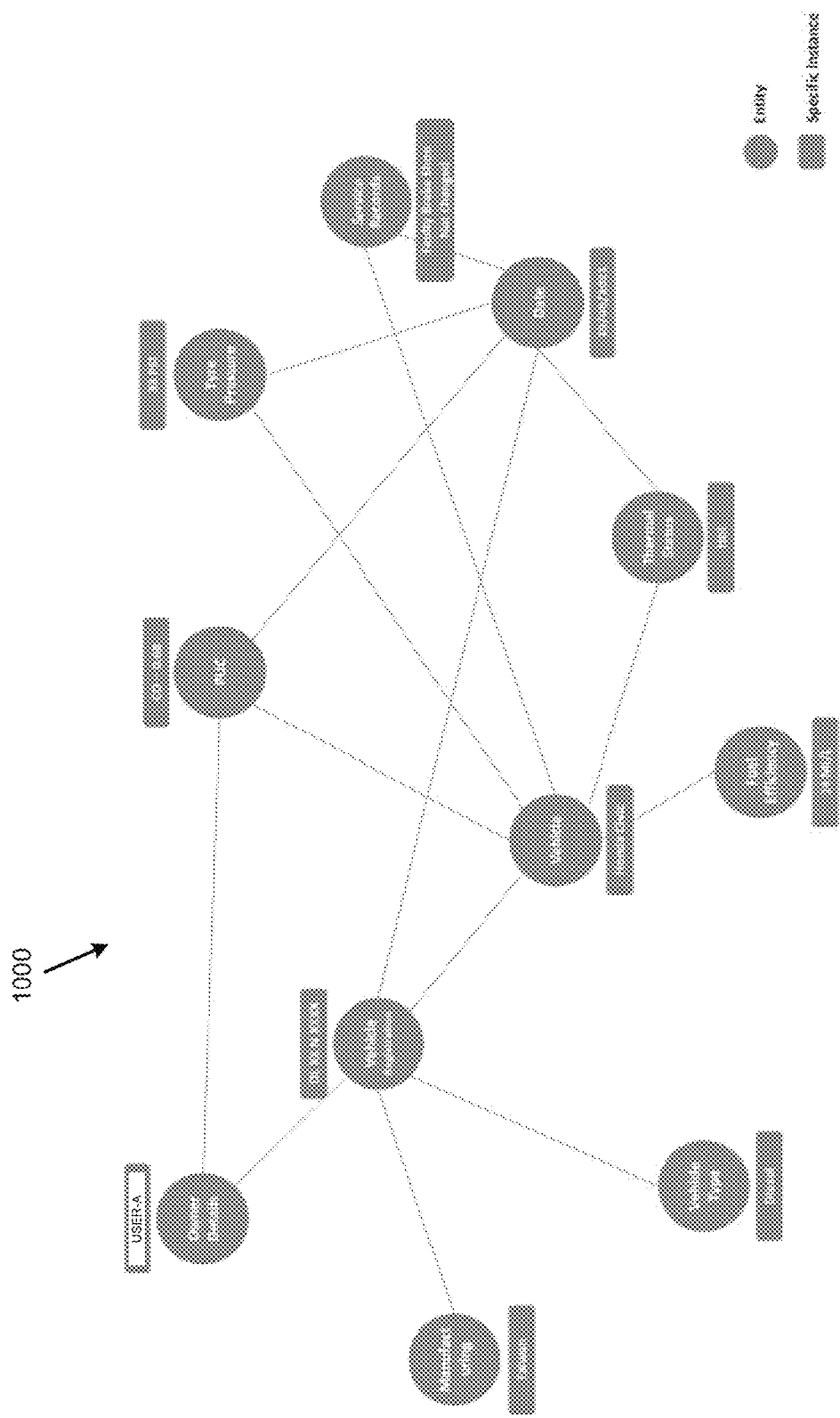
FIG. 10 illustrates a vehicle information knowledge graph of the journey carbon emissions predictor of the user journey carbon footprint reduction apparatus of FIG. 1, in accordance with an example of the present disclosure.

FIG. 10 illustrates a vehicle information knowledge graph of the journey carbon emissions predictor 114, in accordance with an example of the present disclosure.

Referring to FIG. 10, as disclosed herein with respect to FIG. 4, the vehicle information extracted at block 422 may be used to generate a vehicle information knowledge graph at block 424 (e.g., such as vehicle information knowledge graph 1000).

Figure 11:
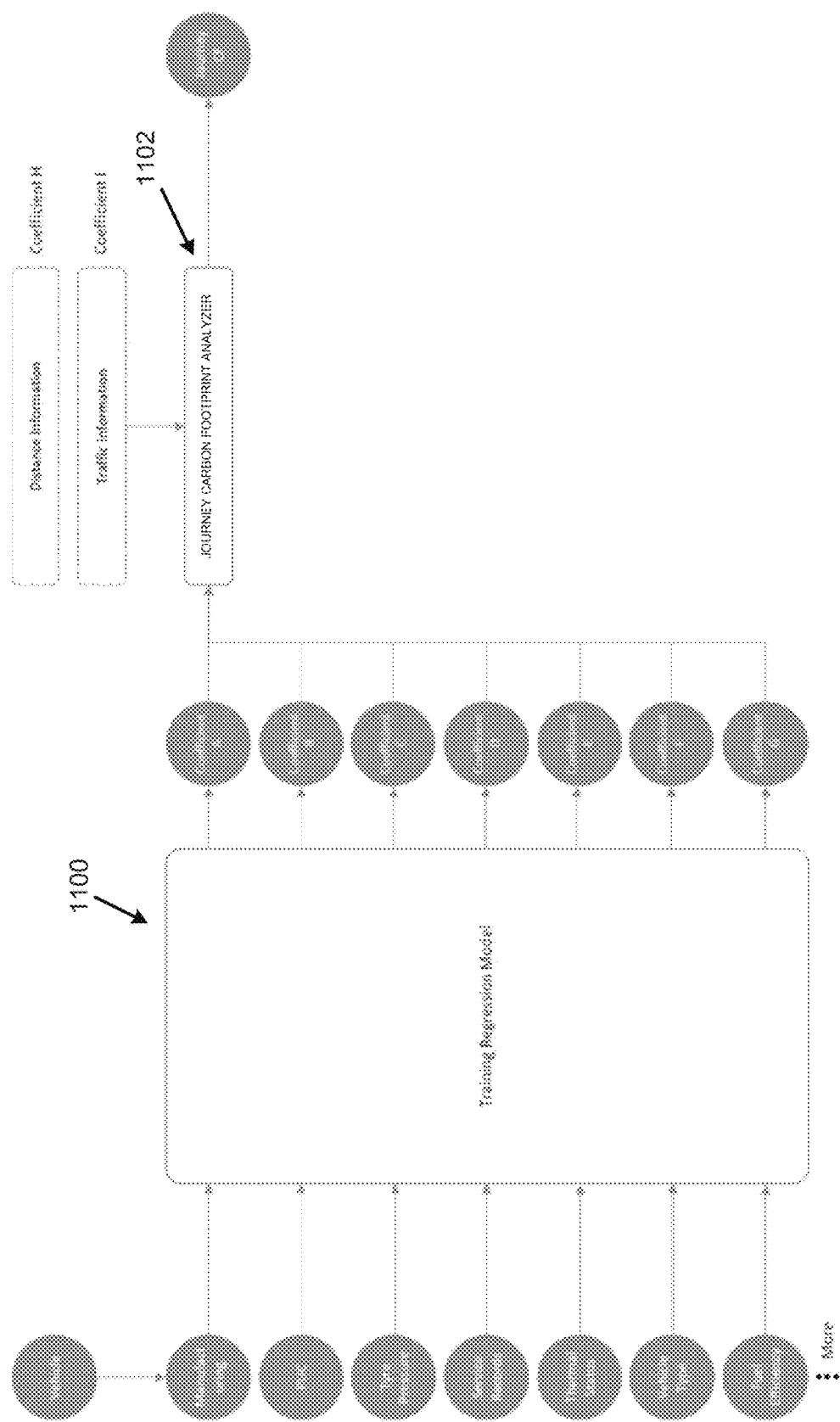
FIG. 11 illustrates a logical flow of a journey carbon footprint analyzer of the journey carbon emissions predictor of the user journey carbon footprint reduction apparatus of FIG. 1, in accordance with an example of the present disclosure.

FIG. 11 illustrates a logical flow of a journey carbon footprint analyzer of the journey carbon emissions predictor 114, in accordance with an example of the present disclosure.

Referring to FIG. 11, the journey carbon emissions predictor 114 may utilize, as shown at 1100, a training regression model to generate an output utilized by a journey carbon footprint analyzer to generate a journey carbon footprint value at 1102. The journey carbon footprint value at 1102 may refer to the predicted carbon footprint of the user journey, and may be measured in terms of Kg CO2e.

FIG. 12 illustrates further details of the journey carbon footprint analyzer to illustrate operation of the journey carbon emissions predictor 114, in accordance with an example of the present disclosure.

Referring to FIG. 12, examples of four cases (e.g., #1 to #4) are shown at 1200 for CF (CO2e) determination.

Figure 13:
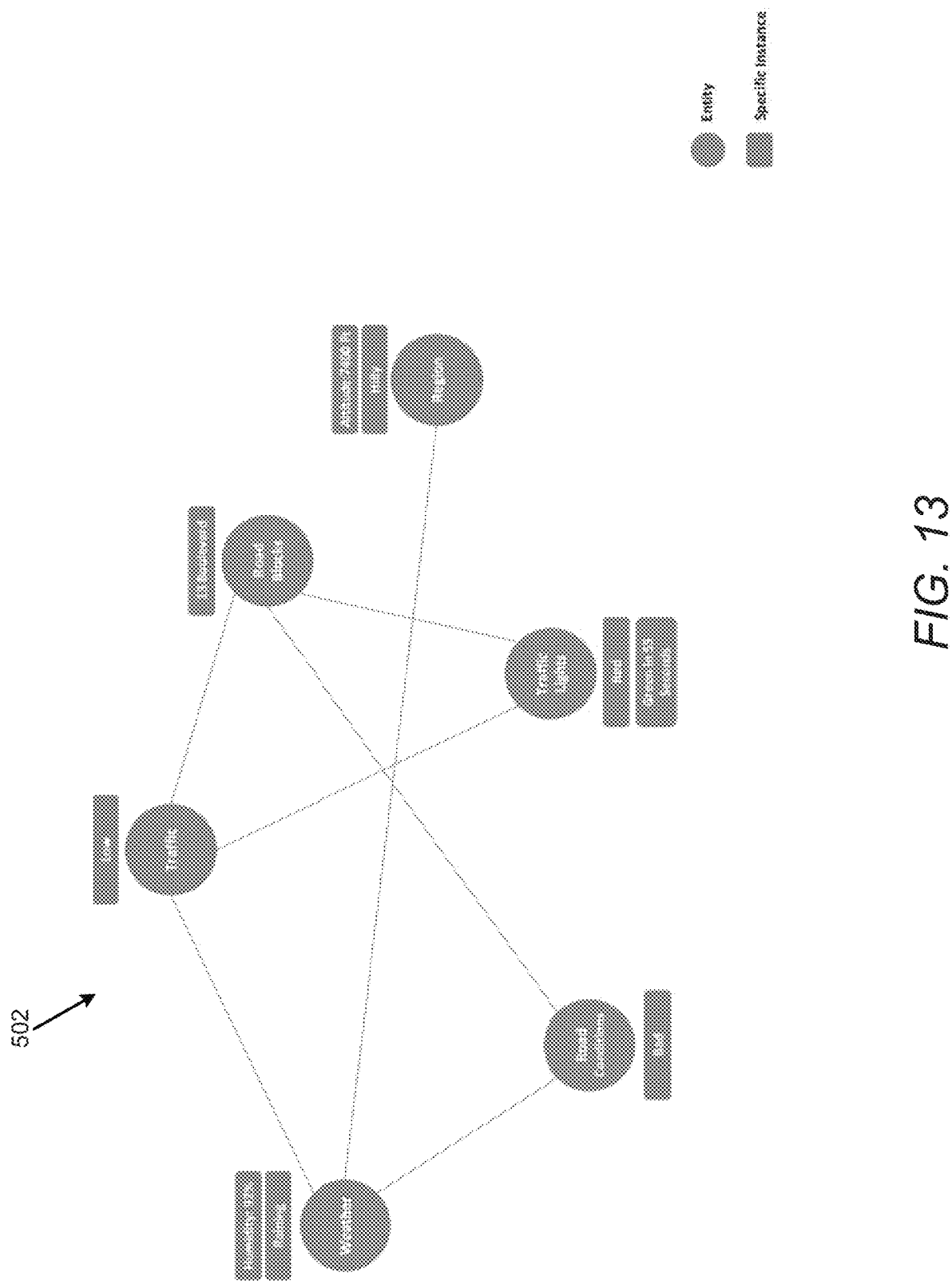
FIG. 13 illustrates a route information knowledge graph of the advisory generator of the user journey carbon footprint reduction apparatus of FIG. 1, in accordance with an example of the present disclosure.

FIG. 13 illustrates a route information knowledge graph of the advisory generator 122, in accordance with an example of the present disclosure.

Referring to FIG. 13, as disclosed herein with respect to FIG. 5, the advisory generator 122 may generate a route information knowledge graph at 502, where the route information knowledge graph at 502 may be used to extract weather data at 504. The route information knowledge graph at 502 may store and correlate all the knowledge/information required to make dynamic carbon footprint predictions by the dynamic carbon footprint analyzer 722 and recommendations by the dynamic advisor 724 of FIG. 7.

Figure 14:
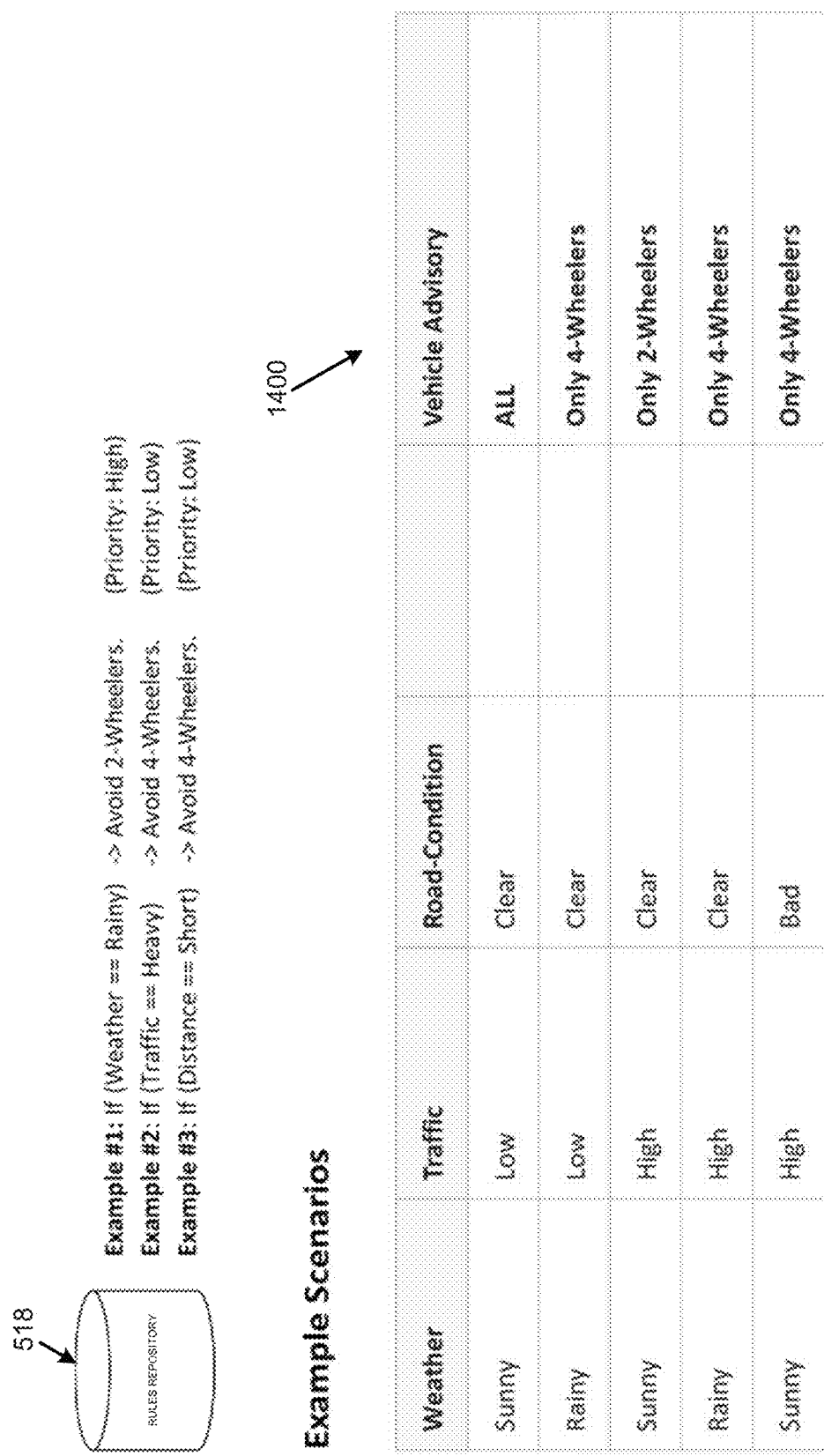
FIG. 14 illustrates operation of a conditions-based advisor of the advisory generator of the user journey carbon footprint reduction apparatus of FIG. 1, in accordance with an example of the present disclosure.

FIG. 14 illustrates operation of a conditions-based advisor of the advisory generator 122, in accordance with an example of the present disclosure.

Referring to FIG. 14, as shown at 1400, the conditions-based advisor 520 of the advisory generator 122 may generate different types of vehicle advisories based on weather conditions such as sunny, rainy, etc. In this regard, as disclosed herein, rules information from rules repository 518 may be fed to the conditions-based advisor 520 of the advisory generator 122.

FIG. 15 illustrates operation of a goals-based advisor of the advisory generator 122, in accordance with an example of the present disclosure.

Referring to FIG. 15, the goals-based advisor 522 of the advisory generator 122 may specify different recommendations upon a user's emission patterns. For example, assuming that an assigned carbon quota is 10 Kg CO2e, a recommendation for a vehicle may be specified at 1500, whereas for a carbon quota of 0.5 Kg CO2e, a recommendation for a vehicle may be specified at 1502.

Figure 16:
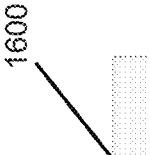
FIG. 16 illustrates operation of a collaborative filtering-based advisor of the advisory generator of the user journey carbon footprint reduction apparatus of FIG. 1, in accordance with an example of the present disclosure.

FIG. 16 illustrates operation of a collaborative filtering-based advisor of the advisory generator 122, in accordance with an example of the present disclosure.

Referring to FIG. 16, the collaborative filtering-based advisor 524 of the advisory generator 122 may specify different recommendations upon different usage patterns as shown at 1600. The collaborative-filtering-based advisor 522 may analyze the vehicles leveraged by other members of the team for their respective commutes (e.g., column #1, #2, and #3), and if appropriate, recommend a low carbon footprint vehicle alternative to the user. For example, if most of the user's team members are traveling via a low (e.g., zero) carbon-emitting bicycle, the user may be recommended to leverage the same as well for their current/future journeys (e.g., column #4). In the table of FIG. 16, since team member #1 and team member #2 prefer a 2-wheeler and a bicycle (which are low carbon footprint vehicles) over 4-wheelers, hence the same has been advised to the user as well.

FIG. 17 illustrates operation of a dynamic carbon footprint analyzer of the real-time journey carbon emissions analyzer 132, in accordance with an example of the present disclosure.

Referring to FIG. 17, the dynamic carbon footprint analyzer may specify different recommendations upon different usage patterns as shown at 1700. The table of FIG. 17 explains how the dynamic carbon footprint analyzer 722 functions. For example, various cases explain the variation in predicted/calculated carbon footprint of the journey, caused by the route information knowledge graph 502 data points. For example, if the humidity is high, then the dynamic carbon footprint analyzer 722 may increase the carbon footprint prediction by X percentage.

FIGS. 18-23 illustrate various user-interface displays to illustrate operation of the apparatus 100, in accordance with an example of the present disclosure.

Figure 18:
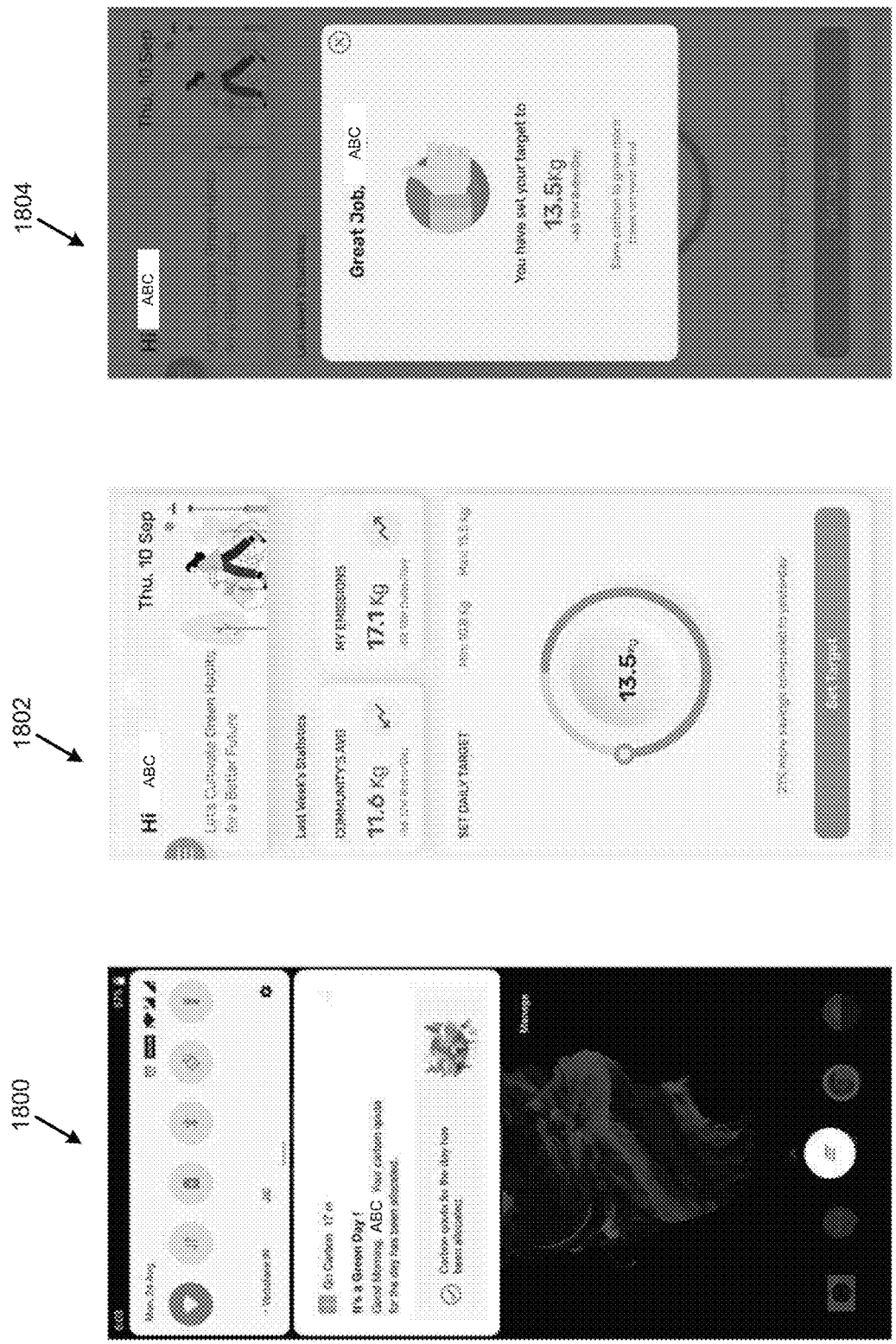

Referring to FIG. 18, the augmented reality-based advisory placement controller 128 may generate, based on the user behavior model 126, a user-interface display 130 for the user journey carbon footprint reduction. At 1800, the user-interface display 130 may include an indication of a carbon allowance (e.g., quota) for a user 106.

At 1802, the user-interface display 130 may include an indication of a carbon footprint of the community of users 110 versus the user 106.

At 1804, the user-interface display 130 may include an indication of whether the user 106 has met a carbon target.

Figure 19:
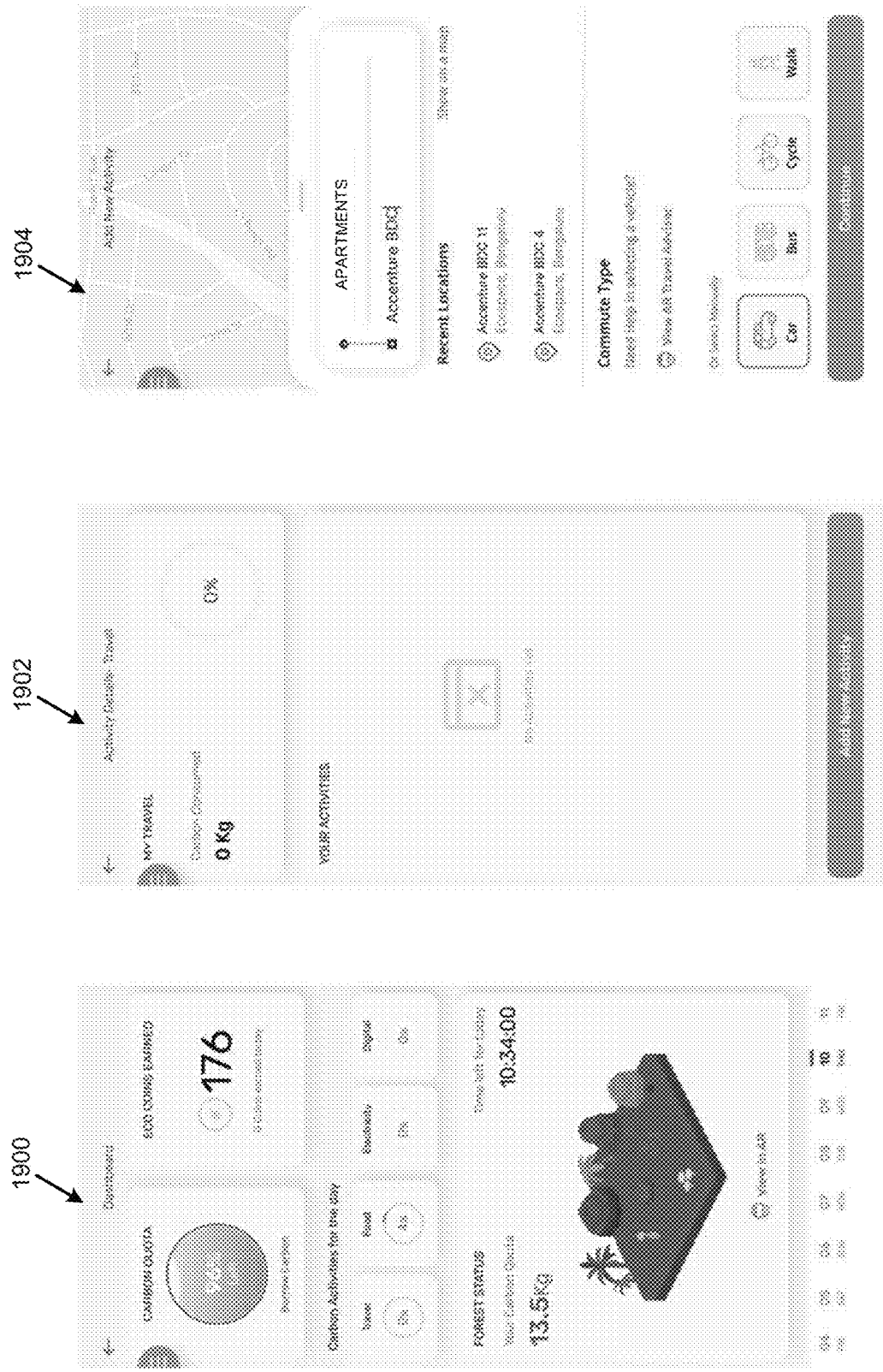

Referring to FIG. 19, at 1900, the user-interface display 130 may include an indication of a carbon allowance (e.g., quota) and eco coins earned.

At 1902, the user-interface display 130 may include an indication of activity details.

At 1904, the user-interface display 130 may include an indication of a route to be taken by a car (e.g., the user's vehicle).

Referring to FIG. 20, the user-interface display 130 may include different views of the user's automobile.

Referring to FIG. 21, at 2100, the user-interface display 130 may include an indication of current conditions.

At 2102, the user-interface display 130 may include a scan area of the user's automobile.

At 2104, the user-interface display 130 may include an indication of a carbon amount for a trip for the user's automobile.

Figure 22:
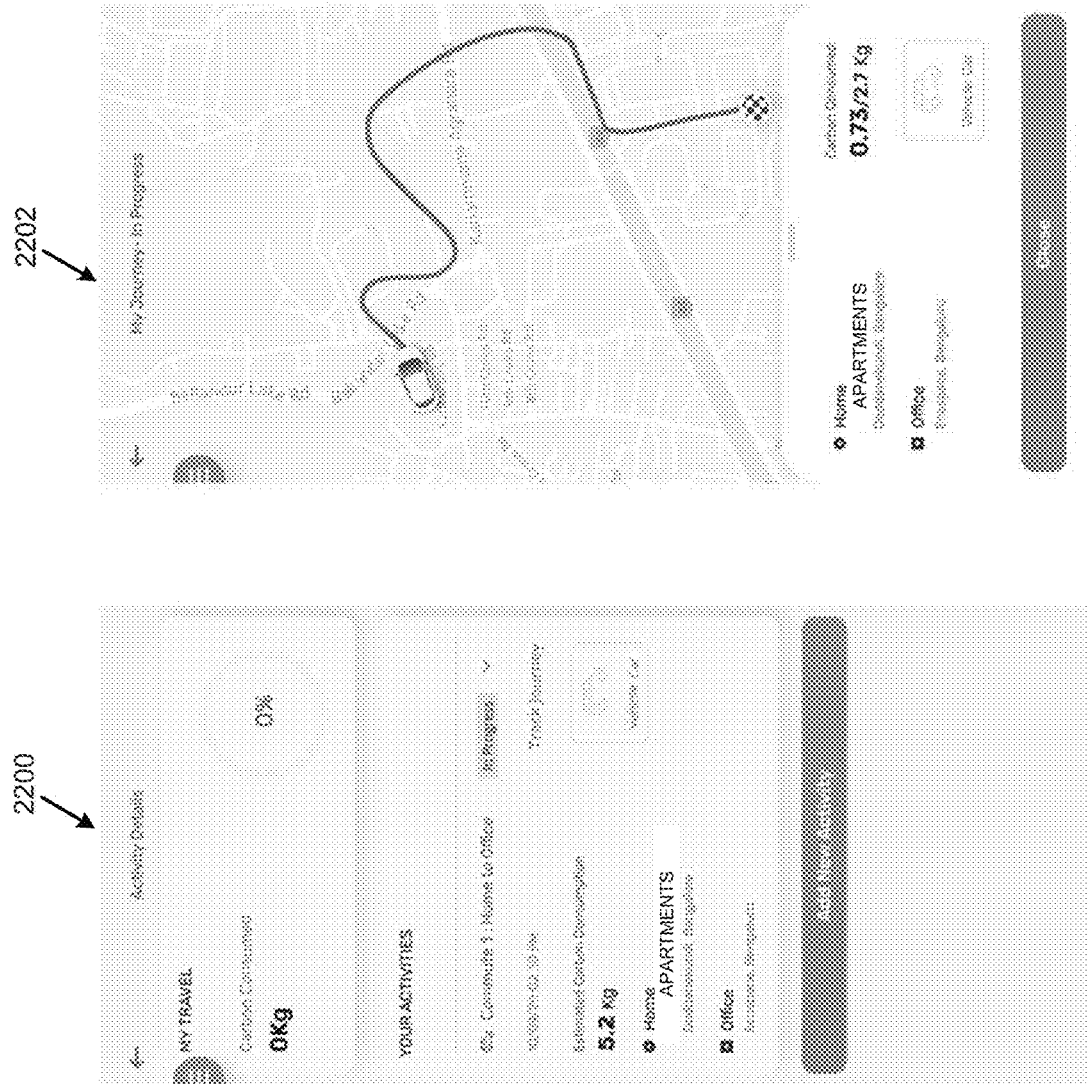

Referring to FIG. 22, at 2200, the user-interface display 130 may include an indication of activity details associated with the user 106.

At 2202, the user-interface display 130 may include an indication of a journey performed (or to be performed) by the user. In this regard, the user journey may remain the same (e.g., specified source and destination). However, the user may be recommended to select a greener vehicle option for the specified journey, and be rewarded for the selection (e.g., vehicle selection, driving style, route selection, etc.).

Referring to FIG. 23, at 2300, the user-interface display 130 may include an indication of eco coins earned by the user 106.

At 2302, the user-interface display 130 may include an indication of eco coins redeemed by the user 106.

At 2304, the user-interface display 130 may include an indication of a status of the user relative to other users.

Figure 24:
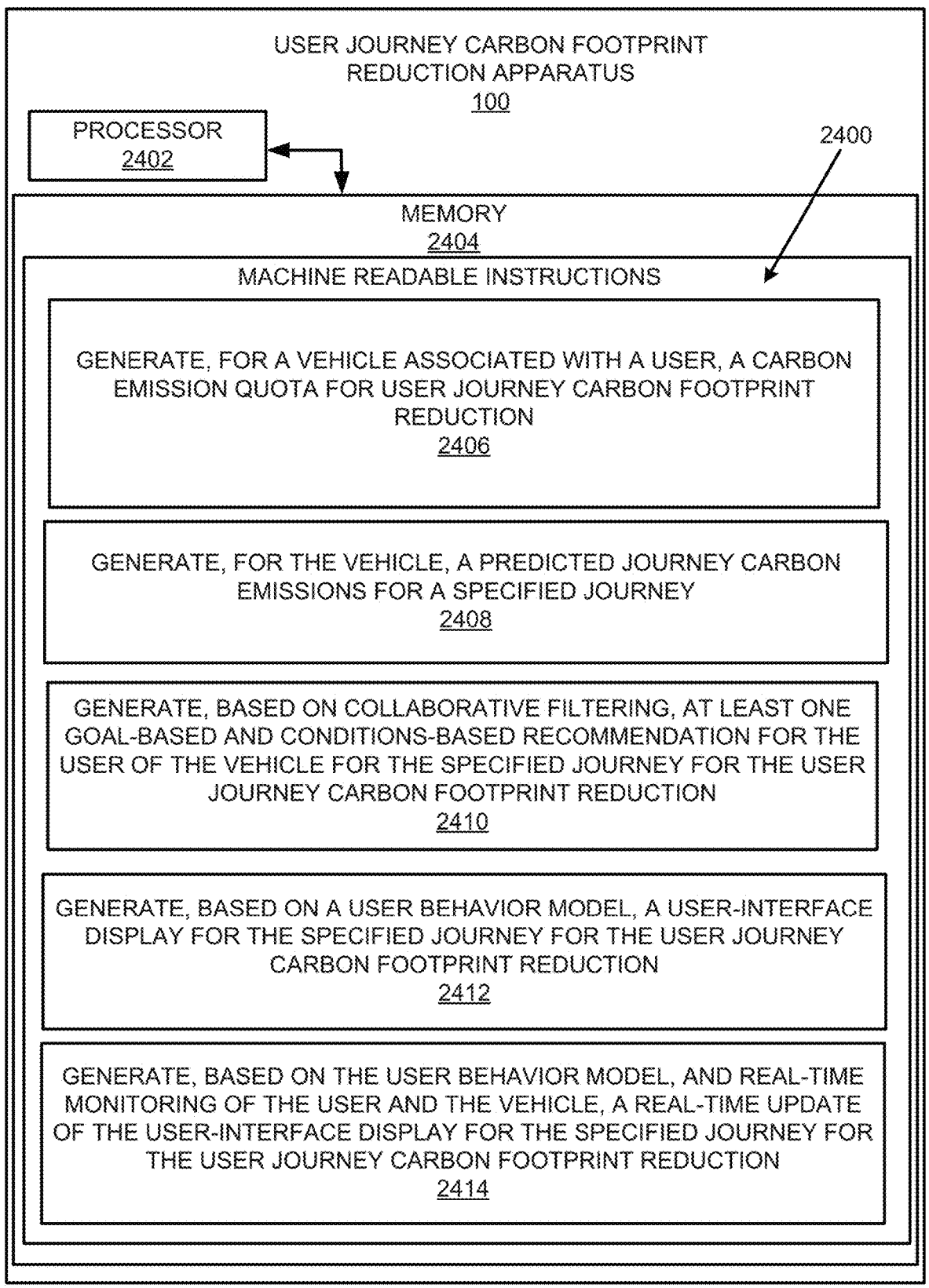
FIG. 24 illustrates an example block diagram for user journey carbon footprint reduction in accordance with an example of the present disclosure.
Figure 26:
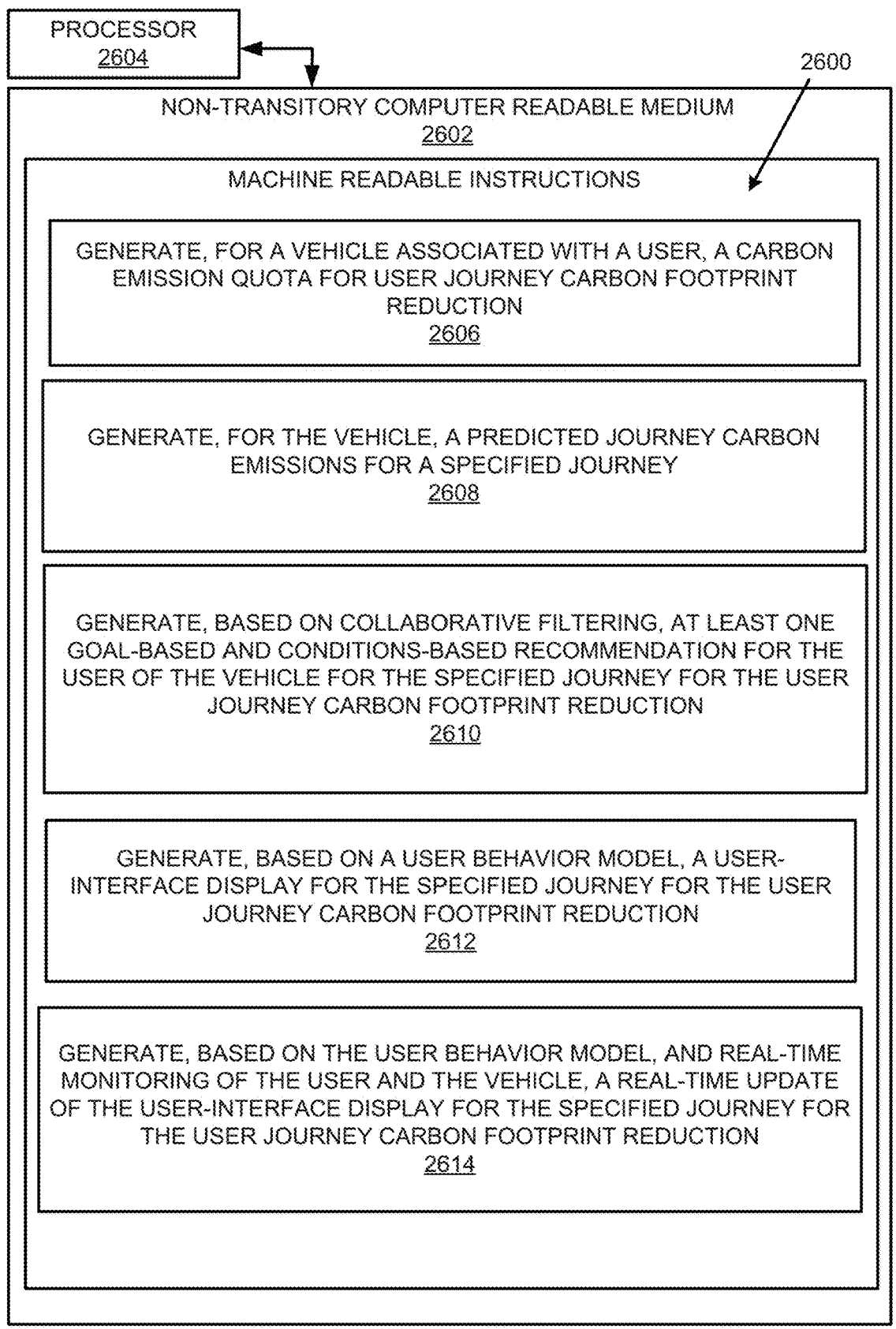
FIG. 26 illustrates a further example block diagram for user journey carbon footprint reduction in accordance with another example of the present disclosure.

FIGS. 24-26 respectively illustrate an example block diagram 2400, a flowchart of an example method 2500, and a further example block diagram 2600 for user journey carbon footprint reduction, according to examples. The block diagram 2400, the method 2500, and the block diagram 2600 may be implemented on the apparatus 100 described above with reference to FIG. 1 by way of example and not of limitation. The block diagram 2400, the method 2500, and the block diagram 2600 may be practiced in other apparatus. In addition to showing the block diagram 2400, FIG. 24 shows hardware of the apparatus 100 that may execute the instructions of the block diagram 2400. The hardware may include a processor 2402, and a memory 2404 storing machine readable instructions that when executed by the processor cause the processor to perform the instructions of the block diagram 2400. The memory 2404 may represent a non-transitory computer readable medium. FIG. 25 may represent an example method for user journey carbon footprint reduction, and the steps of the method. FIG. 26 may represent a non-transitory computer readable medium 2602 having stored thereon machine readable instructions to provide user journey carbon footprint reduction according to an example. The machine readable instructions, when executed, cause a processor 26254 to perform the instructions of the block diagram 2600 also shown in FIG. 26.

The processor 2402 of FIG. 24 and/or the processor 2604 of FIG. 26 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2602 of FIG. 26), such as hardware storage devices (e.g., RAM (random access memory), ROM (read only memory), EPROM (erasable, programmable ROM), EEPROM (electrically erasable, programmable ROM), hard drives, and flash memory). The memory 2404 may include a RAM, where the machine readable instructions and data for a processor may reside during runtime.

Referring to FIGS. 1-24, and particularly to the block diagram 2400 shown in FIG. 24, the memory 2404 may include instructions 2406 to generate, for a vehicle 104 associated with a user 106, a carbon emission quota 108 for user journey carbon footprint reduction.

The processor 2402 may fetch, decode, and execute the instructions 2408 to generate, based on collaborative filtering, at least one goal-based and conditions-based recommendation 124 for the user 106 of the vehicle 104 for the specified journey 118 for the user journey carbon footprint reduction.

The processor 2402 may fetch, decode, and execute the instructions 2410 to generate, based on a user behavior model 126, a user-interface display 130 for the specified journey 118 for the user journey carbon footprint reduction.

The processor 2402 may fetch, decode, and execute the instructions 2412 to generate, based on the user behavior model 126, and real-time monitoring of the user 106 and the vehicle 104, a real-time update of the user-interface display 130 for the specified journey 118 for the user journey carbon footprint reduction.

Referring to FIGS. 1-23 and 25, and particularly FIG. 25, for the method 2500, at block 2502, the method may include generating, for a vehicle 104 associated with a user 106, a carbon emission quota 108 for user journey carbon footprint reduction.

At block 2504, the method may include generating, based on collaborative filtering, at least one goal-based and conditions-based recommendation 124 for the user 106 of the vehicle 104 for the specified journey 118 for the user journey carbon footprint reduction.

At block 2506, the method may include generating, based on a user behavior model 126, a user-interface display 130 for the specified journey 118 for the user journey carbon footprint reduction.

Referring to FIGS. 1-23 and 26, and particularly FIG. 26, for the block diagram 2600, the non-transitory computer readable medium 2602 may include instructions 2606 to generate, for a vehicle 104 associated with a user 106, a carbon emission quota 108 for user journey carbon footprint reduction.

The processor 2604 may fetch, decode, and execute the instructions 2608 to generate, based on collaborative filtering, at least one goal-based and conditions-based recommendation 124 for the user 106 of the vehicle 104 for the specified journey 118 for the user journey carbon footprint reduction.

The processor 2606 may fetch, decode, and execute the instructions 2610 to generate, based on a user behavior model 126, a user-interface display 130 for the specified journey 118 for the user journey carbon footprint reduction.

The processor 2606 may fetch, decode, and execute the generate, based on the user behavior model 126, and real-time monitoring of the user 106 and the vehicle 104, a real-time update of the user-interface display 130 for the specified journey 118 for the user journey carbon footprint reduction.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A user journey carbon footprint reduction apparatus comprising:
   a carbon emission quota allocator, executed by at least one hardware processor, to
      generate, for a vehicle associated with a user, a carbon emission quota for user journey carbon footprint reduction;
   a journey carbon emissions predictor, executed by the at least one hardware processor, to
      generate, for the vehicle, a predicted journey carbon emissions for a specified journey;
   an advisory generator, executed by the at least one hardware processor, to
      generate, based on collaborative filtering, at least one goal-based and conditions-based recommendation for the user of the vehicle for the specified journey for the user journey carbon footprint reduction;
   an augmented reality-based advisory placement controller, executed by the at least one hardware processor, to
      receive, from a depth sensor of a user device, a spatial map of a space including the vehicle;
      analyze, based at least on the spatial map, bounds of the vehicle;
      determine, based on the bounds of the vehicle, an optimal position for placement for an augmented reality user-interface display, wherein the optimal position refers to the vehicle in a user's view without occluding the user's view of the vehicle;
      generate, based on a user behavior model, the augmented reality user-interface display including the at least one goal-based and conditions-based recommendation for the user journey carbon footprint reduction at the optimal position;
   a real-time journey carbon emissions analyzer, executed by the at least one hardware processor, to
      update, based on the user behavior model, and real-time monitoring of at least the user and the vehicle, the augmented reality user-interface display during the specified journey for the user journey carbon footprint reduction.

2. The user journey carbon footprint reduction apparatus according to claim 1, wherein the carbon emission quota allocator is further executed by the at least one hardware processor to:
   generate, based on a community of users, a knowledge model for the user journey carbon footprint reduction.

3. The user journey carbon footprint reduction apparatus according to claim 2, further comprising:
   a user gamification controller, executed by the at least one hardware processor, to
      generate, based on the real-time monitoring of the user and the vehicle, an update to the knowledge model.

4. The user journey carbon footprint reduction apparatus according to claim 1, wherein the carbon emission quota allocator is further executed by the at least one hardware processor to:
   determine whether the user is able to adhere to the carbon emission quota; and
   based on a determination that the user is able to adhere to the carbon emission quota, reduce the carbon emission quota.

5. The user journey carbon footprint reduction apparatus according to claim 4, wherein the carbon emission quota allocator is further executed by the at least one hardware processor to:
   based on a determination that the user is not able to adhere to the carbon emission quota, increase the carbon emission quota.

6. The user journey carbon footprint reduction apparatus according to claim 1, wherein the advisory generator is executed by the at least one hardware processor to generate, based on collaborative filtering, at least one goal-based and conditions-based recommendation for the user of the vehicle for the specified journey for the user journey carbon footprint reduction by:
   generating, by a conditions-based advisor, a weather based recommendation for the user of the vehicle for the specified journey for the user journey carbon footprint reduction.

7. The user journey carbon footprint reduction apparatus according to claim 1, wherein the advisory generator is executed by the at least one hardware processor to generate, based on collaborative filtering, at least one goal-based and conditions-based recommendation for the user of the vehicle for the specified journey for the user journey carbon footprint reduction by:
    generating, by a goals-based advisor, a carbon quota based recommendation for the user of the vehicle for the specified journey for the user journey carbon footprint reduction.

8. The user journey carbon footprint reduction apparatus according to claim 1, wherein the advisory generator is executed by the at least one hardware processor to generate, based on collaborative filtering, at least one goal-based and conditions-based recommendation for the user of the vehicle for the specified journey for the user journey carbon footprint reduction by:
    generating, by a collaborative filtering-based advisor, a usage based recommendation for the user of the vehicle for the specified journey for the user journey carbon footprint reduction.

9. The user journey carbon footprint reduction apparatus according to claim 1, wherein the real-time journey carbon emissions analyzer is executed by the at least one hardware processor to generate, based on the user behavior model, and real-time monitoring of the user and the vehicle, the real-time update of the user-interface display for the specified journey for the user journey carbon footprint reduction by:
    generating the real-time update of the user-interface display to include alternate routes, vehicle turnoff recommendations, and driving tips.

10. The user journey carbon footprint reduction apparatus according to claim 1, further comprising:
    a metaphor mapper to:
        receive a user selection of a metaphor; and
        generate the metaphor for an impact of the specified journey on the user's carbon footprint in terms of equivalent metaphor.

11. A method for user journey carbon footprint reduction, the method comprising:
    generating, by at least one hardware processor, for a vehicle associated with a user, a carbon emission quota for user journey carbon footprint reduction;
    generating, by the at least one hardware processor, for the vehicle, a predicted journey carbon emissions for a specified journey; and
    generating, by the at least one hardware processor, based on collaborative filtering, at least one goal-based and conditions-based recommendation for the user of the vehicle for the specified journey for the user journey carbon footprint reduction;
    receiving by the at least one hardware processor, from a depth sensor of a user device, a spatial map of a space including the vehicle;
    analyzing based at least on the spatial map by the at least one hardware processor, bounds of the vehicle, wherein the optimal position points to the vehicle in the user's view without occluding the user's view of the vehicle;
    determining, based on the bounds of the vehicle by the at least one hardware processor, an optimal position for placement for an augmented reality user-interface display;
    generating, based on a user behavior model by the at least one hardware processor, the augmented reality user-interface display including the at least one goal-based and conditions-based recommendation for the user journey carbon footprint reduction;
    positioning by the at least one hardware processor, the augmented reality user interface display at the optimal position within the user's field of view; and
    updating by the at least one hardware processor based on the user behavior model and real-time monitoring of the user and the vehicle, the augmented reality user-interface display during the specified journey for the user journey carbon footprint reduction.

12. The method according to claim 11, further comprising:
    generating, by the at least one hardware processor, based on a community of users, a knowledge model for the user journey carbon footprint reduction.

13. The method according to claim 12, further comprising:
    generating, by the at least one hardware processor, based on the real-time monitoring of the user and the vehicle, an update to the knowledge model.

14. The method according to claim 11, wherein generating, by the at least one hardware processor, based on the user behavior model, and real-time monitoring of the user and the vehicle, the real-time update of the user-interface display for the specified journey for the user journey carbon footprint reduction further comprises:
    generating the real-time update of the user-interface display to include alternate routes, vehicle turnoff recommendations, and driving tips.

15. A non-transitory computer readable medium having stored thereon machine readable instructions, the machine readable instructions, when executed by at least one hardware processor, cause the at least one hardware processor to:
    generate, for a vehicle associated with a user, a carbon emission quota for user journey carbon footprint reduction;
    generate, for the vehicle, a predicted journey carbon emissions for a specified journey;
    generate, based on collaborative filtering, at least one goal-based and conditions-based recommendation for the user of the vehicle for the specified journey for the user journey carbon footprint reduction;
    receive, from a depth sensor of a user device, a spatial map of a space including the vehicle;
    analyze, based at least on the spatial map, bounds of the vehicle, wherein the optimal position points to the vehicle in the user's view without occluding the user's view of the vehicle;
    determine, based on the bounds of the vehicle, an optimal position for placement for an augmented reality user-interface display;
    generate, based on a user behavior model, the augmented reality user-interface display including the at least one goal-based and conditions-based recommendation for the user journey carbon footprint reduction;
    position the augmented reality user interface display at the optimal position within the user's field of view; and
    update, by the at least one hardware processor, based on the user behavior model, and real-time monitoring of the user and the vehicle, the augmented reality user-interface display for the specified journey for the user journey carbon footprint reduction.

16. The non-transitory computer readable medium according to claim 15, the machine readable instructions, when executed by the at least one hardware processor, further cause the at least one hardware processor to:
    generate, based on a community of users, a knowledge model for the user journey carbon footprint reduction.

17. The non-transitory computer readable medium according to claim 16, the machine readable instructions, when executed by the at least one hardware processor, further cause the at least one hardware processor to:

generate, based on the real-time monitoring of the user and the vehicle, an update to the knowledge model.

18. The non-transitory computer readable medium according to claim 15, the machine readable instructions to generate, based on collaborative filtering, at least one goal-based and conditions-based recommendation for the user of the vehicle for the specified journey for the user journey carbon footprint reduction, when executed by the at least one hardware processor, further cause the at least one hardware processor to:

generate a weather based recommendation for the user of the vehicle for the specified journey for the user journey carbon footprint reduction.

19. The non-transitory computer readable medium according to claim 15, the machine readable instructions to generate, based on collaborative filtering, at least one goal-based and conditions-based recommendation for the user of the vehicle for the specified journey for the user journey carbon footprint reduction, when executed by the at least one hardware processor, further cause the at least one hardware processor to:

generate a carbon quota based recommendation for the user of the vehicle for the specified journey for the user journey carbon footprint reduction.

20. The non-transitory computer readable medium according to claim 15, the machine readable instructions to generate, based on collaborative filtering, at least one goal-based and conditions-based recommendation for the user of the vehicle for the specified journey for the user journey carbon footprint reduction, when executed by the at least one hardware processor, further cause the at least one hardware processor to:

generate a usage based recommendation for the user of the vehicle for the specified journey for the user journey carbon footprint reduction.

* * * * *